(12) United States Patent
Doll

(10) Patent No.: US 6,728,399 B1
(45) Date of Patent: Apr. 27, 2004

(54) METHOD AND APPARATUS FOR DEFINING COLOR BORDERS IN A RASTER IMAGE BY IDENTIFYING AND BREAKING CONTRAST TIES

(75) Inventor: Joseph Doll, Westminster, CO (US)

(73) Assignee: Colorcom, Ltd., Broomfield, CO (US)

( * ) Notice: Subject to any disclaimer, the term of this patent is extended or adjusted under 35 U.S.C. 154(b) by 0 days.

(21) Appl. No.: 09/282,769

(22) Filed: Mar. 31, 1999

Related U.S. Application Data

(63) Continuation-in-part of application No. 08/104,302, filed on Aug. 9, 1993, now Pat. No. 5,362,796.

(51) Int. Cl.$^7$ .................................................. G06K 9/00
(52) U.S. Cl. ..................... 382/164; 382/163; 382/205; 382/266
(58) Field of Search .................... 382/162–167, 382/173–180, 199–205, 266–275

(56) References Cited

U.S. PATENT DOCUMENTS

| | | | |
|---|---|---|---|
| 4,603,431 A | 7/1986 | Grover et al. ................ | 382/56 |
| 4,648,119 A | 3/1987 | Wingfield et al. ............ | 382/27 |
| 4,777,651 A | 10/1988 | McCann et al. .............. | 382/21 |
| 4,958,225 A | 9/1990 | Bi et al. ...................... | 358/133 |
| 5,007,098 A | 4/1991 | Kumagai ..................... | 382/21 |
| 5,086,439 A | 2/1992 | Asai et al. ................... | 375/122 |
| 5,115,479 A | 5/1992 | Murayama ................... | 382/56 |
| 5,233,671 A | 8/1993 | Murayama ................... | 382/56 |
| 5,375,177 A | 12/1994 | Vaidyanathan et al. ....... | 382/48 |
| 5,396,582 A | 3/1995 | Kahkoska ................... | 395/103 |
| 5,579,405 A | 11/1996 | Ishida et al. ................. | 382/197 |
| 5,586,200 A | 12/1996 | Devancey et al. .......... | 382/232 |
| 5,642,476 A | 6/1997 | Turner ......................... | 395/143 |
| 5,647,027 A | 7/1997 | Burges et al. .............. | 382/275 |
| 5,815,596 A * | 9/1998 | Ahuja et al. ................ | 382/173 |
| 5,901,245 A | 5/1999 | Warnick et al. ............. | 382/190 |
| 6,226,400 B1 * | 5/2001 | Doll ............................ | 382/163 |
| 6,234,300 B1 * | 11/2001 | Doll ............................ | 382/162 |

FOREIGN PATENT DOCUMENTS

| | | | |
|---|---|---|---|
| EP | 0 090 395 | 5/1983 | ........... G06F/15/20 |
| EP | 0 375 805 | 7/1990 | ........... G06F/15/62 |

OTHER PUBLICATIONS

Herbert Freeman, "On the Encoding of Arbitrary Geometric Configurations", *IRE Transactions on Electronic Computers*, Jun. 1961.

Herbert Freeman, "Boundary Encoding Revisited", chapt. in *Advances in Image Understanding*, Kevin Bower and Narendra Ahuja, eds. IEEE Computer Society Press, Los Alimitos, CA, 1996.

* cited by examiner

Primary Examiner—Amelia M. Au
Assistant Examiner—Jinnge Wu
(74) Attorney, Agent, or Firm—Howard H. Sheerin

(57) ABSTRACT

A method and apparatus is disclosed for converting raster images into a vector format by identifying and converting the borders of image features into a mathematical format referred to as string sequences. To enable the string sequencing of color images, the present invention identifies and resolves contrast conflicts in the image features in order to avoid misperceiving the vectorized image when converted back into a raster format. A contrast conflict occurs when there is a "contrast tie" between overlapping features of the image. The feature that would normally be perceived as the dominant feature breaks the contrast tie so that when the vector image is reconstructed, the dominate feature appears in the foreground of the image while the recessive feature appears in the background. A contrast tie detector (CTD) performs a set of comparisons on the raw pixel data to detect the occurrence of a contrast tie, and a contrast tie breaker (CTB) performs another set of comparisons on the raw pixel data to break the contrast tie. A contrast tie is broken by modifying a color identifier of a perimeter pixel relative to the color identifier of a target pixel, thereby enabling the correct string sequencing of color borders.

32 Claims, 13 Drawing Sheets

|   |   |   |
|---|---|---|
| $P_0$ | $P_1$ | $P_2$ |
| $P_3$ | T | $P_4$ |
| $P_5$ | $P_6$ | $P_7$ |

METHOD AND APPARATUS FOR DEFINING COLOR BORDERS IN A RASTER IMAGE BY IDENTIFYING AND BREAKING CONTRAST TIES

This application is a continuation-in-part of U.S. patent application Ser. No. 08/104,302 filed on Aug. 9, 1993 now U.S. Pat No. 5,362,796 the entire disclosure of which is hereby incorporated by reference.

FIELD OF INVENTION

The present invention relates to the conversion of a raster image into a vector format, particularly to an apparatus and method for breaking contrast ties within a localized area of the image which enables the further step of defining color borders.

BACKGROUND OF THE INVENTION

Image processing generally refers to the manipulation of pictorial data using computers. Computer Aided Design (CAD) is one example of how computers are used to draft complex engineering drawings such as mechanical, architectural or electrical drawings. Other examples of image processing include the manipulation of still photographs or cinema to achieve various effects such as feature enhancement, three-dimensional rendering, or animation. However, the term "image processing" is not limited to pictures—it generally refers to the digitization and computer processing of any analog signal that represents something physical and perceptible in the world. An audio signal can be digitized and processed with computers to perform manipulations such as noise reduction or voice recognition; modulated electrical signals, such as telecommunications or cardiograms, can be digitized and processed by computers to extract pertinent information, and so on. The common factor in image processing is the need to digitize the continuous-time analog signal into a discrete-time digital signal that can be operated on by computers using boolean mathematics implemented in transistor logic circuits.

A common format for storing and manipulating digitized signals is simply to represent the digital data as a bit-map of pixels, where each pixel represents a particular characteristic (e.g., magnitude or color) of the analog signal. Typically, a picture is digitized into a bit-map of individual pixels where each pixel represents a color of the image in a very small, localized area. When the pixels are displayed as a congregation, the original picture appears without loss of perception to the human eye as long as there is sufficient resolution (number of pixels) both in spatial and color contexts. A black and white picture can be represented with one-bit pixels, where the state of the bit (0 or 1) represents the two colors, black and white. To digitize a picture comprising multiple colors, each pixel is represented using n-bits such that each pixel can take on one of $2^n$ different colors. The process of converting an analog image into a bit-map image is referred to as "rasterizing" the image.

There are several well known problems with raster images that limit or inhibit the full potential of computer manipulation. The amount of memory necessary to store a large photograph having many colors (thousands or even millions of colors) can be immense, and the problem is exacerbated when attempting to digitize a series of photographs such as a scene in a movie. Not only do raster images require large amounts of storage memory, but processing such a large amount of data can be slow, particularly when attempting to transfer raster images over a network such as the internet.

Another problem inherent with the raster format is an inability to perform many of the desired image processing functions, such as three-dimensional rendering or animation. Even a simple operation such as magnifying the image results in a granular distortion caused by enlarging the pixels of the image as illustrated in FIG. 1. It is possible to perform digital signal processing when magnifying a raster image by effectively re-sampling the image to attenuate the granular distortion that occurs due to the fixed resolution. However, this process only reduces the granular distortion rather than eliminate it. Furthermore, resampling the image is time consuming and not practical in many applications. Other operations, such as electronic focusing and automatic imaging, are simply not possible when the image is stored in a raster format.

The alternative is to convert the raster image into a mathematical format known as vectors. A vector is a mathematical description of the image which is not constrained by a fixed resolution as with raster data. Furthermore, vectors allow for a much more diverse range of image manipulations due to the mathematical representation of the image. A simple example of a vector is a line beginning at a particular X,Y point in a cartesian plane and ending at another X,Y point in that plane. To date, however, converting raster images into a series of linear vectors has been largely unsuccessful. This is due to the immense number of different possible patterns that raster images can form. For example, a 3 by 3 pixel matrix of a nine color picture can take on about 21,000 different possible patterns. Each possibility must be accounted for when converting the image into a set of linear vectors. If just one more pixel is added to the matrix, the complexity increases exponentially. Consequently, techniques for converting raster images into linear vectors normally operate on only a small section of the image at a time. The problem with this approach is that the resulting vectorized image appears fragmented due to discontinuities when the individual sections are combined.

There have been other attempts to convert a raster image using vectors that are more abstract mathematical representations. For example, a technique referred to as wavelets attempts to represent the raster image as a series of interconnected mathematical equations. With wavelets, a particular feature of the image might be represented using a number of polynomials which approximate the feature contours. The problem with this technique, however, is that the equations become extremely complex unless the operation is constrained to only a small group of pixels. But again, distortion due to fragmentation occurs when attempting to combine the individual equations into a complete image. A similar distortion occurs with using fractals, a method where the image is represented using a library of different shapes which approximate the various features of an image. Similar to wavelets, however, discontinuities occur with fractals when attempting to combine the individual shapes which causes distortion due to fragmentation.

Another known method for raster to vector conversion, referred to as the Automatic Bezier Curve technique, draws Bezier curves through tags that are placed somewhat arbitrarily on the image. Unlike fractals or wavelets, Bezier techniques cannot convert complicated pictures without losing information. On the other hand, the Bezier technique can sequence equations together over a large number of pixels which reduces the amount of fragmentation typically associated with other techniques.

The Bezier method is illustrated in FIG. 1B. The first step is to identify the color borders for each feature in the image, and then to place somewhat arbitrarily tags on the borders.

These tags then become the new representation of the image. When the image is to be displayed, these tags are converted into a rasterized format by drawing Bezier curves through the tags as shown in FIG. 1B. The problem with the Bezier conversion technique is that it has a hard time dealing with complicated images. When tags are placed some definition is lost. In a complex image, many tags are placed resulting in a great deal of loss in picture definition. Even more severe is that the Bezier technique only looks at simple borders. In complex images, there is usually an interaction of shades that catch the eye. The Bezier curve technique treats all of these different shades as either borders or points. This often results in a vector representation that is more complicated than a raster representation; in effect, the Bezier solution can actually be worse than the problem.

There have been other attempts to represent the feature contours of an image using mathematics capable of spanning more than just a small area on the image. For example, U.S. Pat. No. 4,777,651 discloses a method of pixel-to-vector conversion where the line and edge features of the image are converted into a series of continous line segments. The line segments are generated by connecting a series of slope elements which follow the contour of a line or edge in the image. The slope elements are generated by scanning a 3×3 array of pixels through the raster image data and generating a slope vector for each pixel. The 3×3 array of pixels are evaluated to determine the slope of the image contour at the current pixel. The slope elements are then connected to form continous line segments that represent the contours of the image. The line segments are further processed to generate the vectors that can be understood and manipulated using computers.

The process of sequencing a series of slope elements into line segments which represent the contours of an image has been known in the art as early as 1961. See H. Freeman, "On the Encoding of Arbitrary Geometric Configurations," IRE Transactions, EC-10(2), June 1961, 260–268. Freeman describes the technique of scanning a square matrix through raster data to generate a slope element for each pixel, and then connecting the slope elements into line segments which represent the image contours.

There are drawbacks with the aforementioned prior art methods of sequencing slope elements into line segments to represent the image contours. Namely, U.S. Pat. No. 4,777,651 is capable of sequencing line segments for contours of only black and white images. Thus, this technique cannot be applied to color images without first converting the image into black and white which means the color information is lost. Furthermore, the list of square matrices for generating the slope elements shown in FIG. 9 is not exhaustive and, consequently, fragmentation can occur when attempting to generate and connect the line segments. Still further, sequencing the line segments using only the slope values does not provide optimal information for generating the final vectors which ultimately represent the image. In other words, the vectors generated using this technique are not optimal because there is not enough information provided in line segments comprised of only slope values. Also, these techniques do not address the optical illusion which can manifest in images where the contrast in certain features determines or enables perception.

There is, therefore, a need for an improved method and apparatus for converting the contours or borders of a raster image into a more abstract mathematical representation which can be converted into a vector format without fragmenting the image. More specifically, it is an object of the present invention to convert the color borders of a raster image into a mathematical representation, wherein the raster image is comprised of pixels representing more colors than just black and white. Another object of the present invention is to provide enough information in the border representation of the image so as to optimize the vectors ultimately generated from this information. Still another object of the present invention is to identify and resolve contrast conflicts in the various features of an image in order to avoid misperceiving the vectorized image when converted back into a raster format.

SUMMARY OF THE INVENTION

The present invention discloses a method and apparatus for converting the color borders of a raster image into a more abstract mathematical representation that can be converted into a vector format without significantly fragmenting the image. The invention involves scanning a neighborhood of cells in the form of a square matrix through the raster image in order to generate a surface string (or an indicia thereof) representing the color border at each pixel, and then to sequence the surface strings into string sequences which represent the color borders.

The neighborhood of cells comprise a target cell (e.g., a center cell) and a number of surrounding perimeter cells. Each cell corresponds to a pixel in the raster image. A color value is assigned to the perimeter cells indicating whether the pixel represented by the perimeter cell is the same or different in color from the pixel represented by the target cell. Thus, there is a limited number of different color combinations that are possible in a neighborhood (e.g., 256 in a 3×3 neighborhood).

As the neighborhood is scanned through the raster image, the color values of the cells are changed according to the color of the perimeter pixels relative to the target pixel. The resulting neighborhood is then used to index a neighborhood table comprising all the possible different color combinations, that is, all the different possible neighborhoods. The neighborhood table outputs up to six different surface strings which represent the color border or borders which pass through the current neighborhood of pixels comprising the current target pixel. There is a limited number of possible surface strings that are necessary to account for all the different possible color combinations in a neighborhood. However, a significant aspect of the present invention is to provide an exhaustive set of surface strings that can account for all the possible arrangements of color borders in a raster image. In the preferred embodiment, a neighborhood comprises a 3×3 square matrix of cells which results in an exhaustive set of 58 surface strings.

Each surface string has associated with it a receive slope and a send slope which represent the slope of a corresponding color border passing through the neighborhood. The receive and send slopes are used by a string sequencer to connect the surface strings into a contiguous string sequence representing a color border in the image. Although the receive and send slopes are used to connect the surface strings, the string sequencer actually sequences numbers which identify the surface strings rather than merely sequencing slope values as is done in the aforementioned prior art techniques. Sequencing surface string IDs, as opposed to merely sequencing slopes, provides additional information about each surface string which can be used to generate vectors that better represent the raster image.

Another enabling aspect of the present invention is to sequence the surface strings according to a predetermined criteria. In the preferred embodiment, a priority is assigned to surface strings based on their location in the image and their type. Northern surface strings have the highest priority meaning that a string sequence will begin with the most northern surface string in the image, and the sequencing of strings will always progresses from north to south—never from south to north. The next highest priority is assigned to a special type of surface string referred to as a "protruding corner" surface string. That is, a "protruding corner" surface string has priority over a "square corner" surface string which has priority over a "step" surface string. So if two surface strings are at the same northern position in an image, the surface string type determines which surface string to begin a string sequence and in which direction to sequence. If two surface strings at the same northern location are of the same type, then the western surface string has priority over the eastern surface string.

To enable the string sequencing of color images, the present invention identifies and resolves contrast conflicts in the image features in order to avoid misperceiving the vectorized image when converted back into a raster format. A contrast conflict occurs when there is a "contrast tie" between overlapping features of the image. The feature that would normally be perceived as the dominant feature breaks the contrast tie so that when the vector image is reconstructed, the dominate feature appears in the foreground of the image while the recessive feature appears in the background. A contrast tie detector (CTD) performs a set of comparisons on the raw pixel data to detect the occurrence of a contrast tie, and a contrast tie breaker (CTB) performs another set of comparisons on the raw pixel data to break the contrast tie. A contrast tie is broken by modifying a color identifier of a perimeter pixel relative to the color value of a target pixel, thereby enabling the correct string sequencing of color borders. These and other aspects and advantages of the present invention will be better understood by reading the following detailed description of the invention in conjunction with the following drawings.

BRIEF DESCRIPTION OF THE DRAWINGS

FIG. 7A shows the four quadrants in a 3×3 array of pixels that are processed to detect a contrast tie.

FIG. 7B shows the four quadrants in a 3×3 array of pixels and surrounding pixels that are processed to break a contrast tie.

FIG. 7C illustrates an enhancement to the aspect of breaking contrast ties wherein the corner pixels of the 4×34 array of pixels are also evaluated.

FIG. 7D illustrates yet another enhancement to breaking contrast ties wherein the pixels evaluated is expanded to a 5×5 array of pixels.

DETAILED DESCRIPTION OF THE PREFERRED EMBODIMENT

Figure 1A:
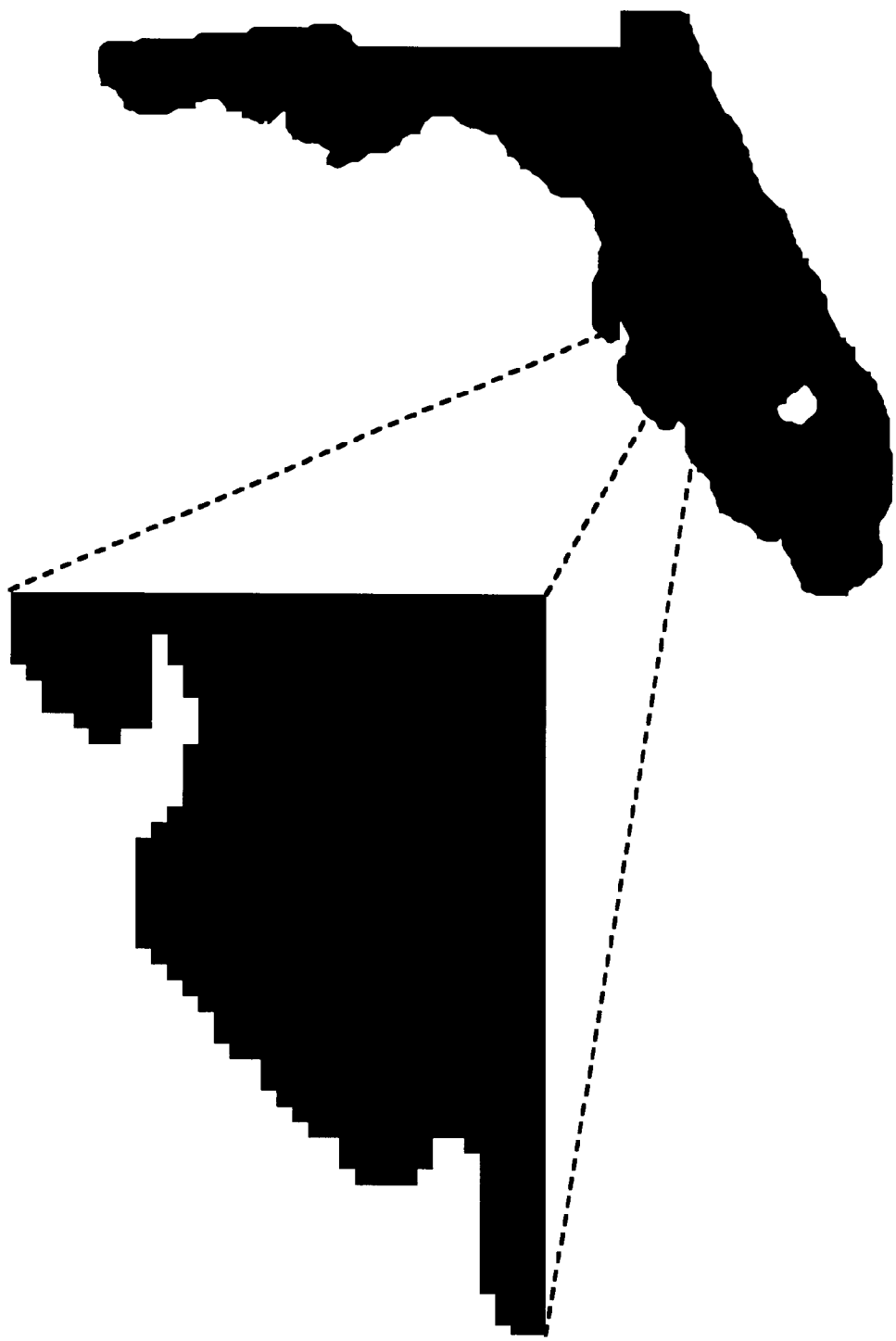
FIG. 1A illustrates the granular distortion that occurs when magnifying a raster image.
Figure 1B:
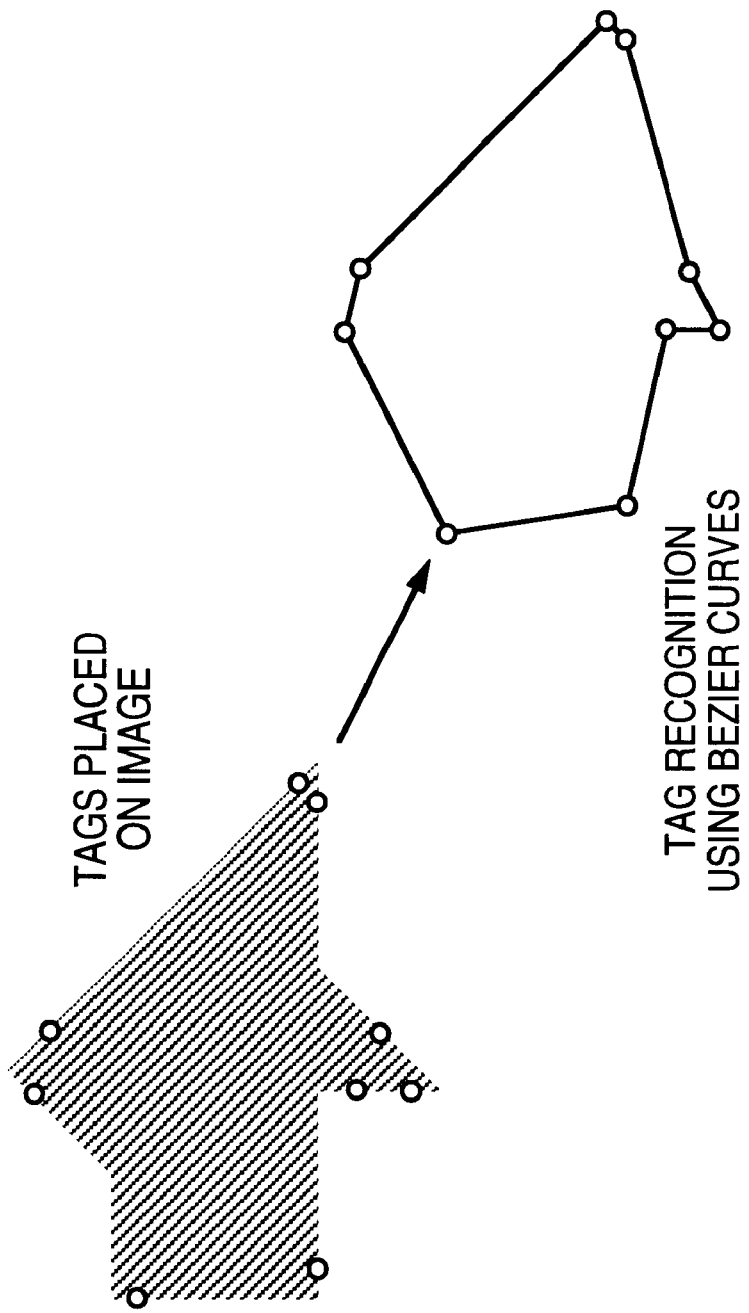
FIG. 1B illustrates a prior art Bezier curve technique for converting raster images into vectors.
Figure 2:
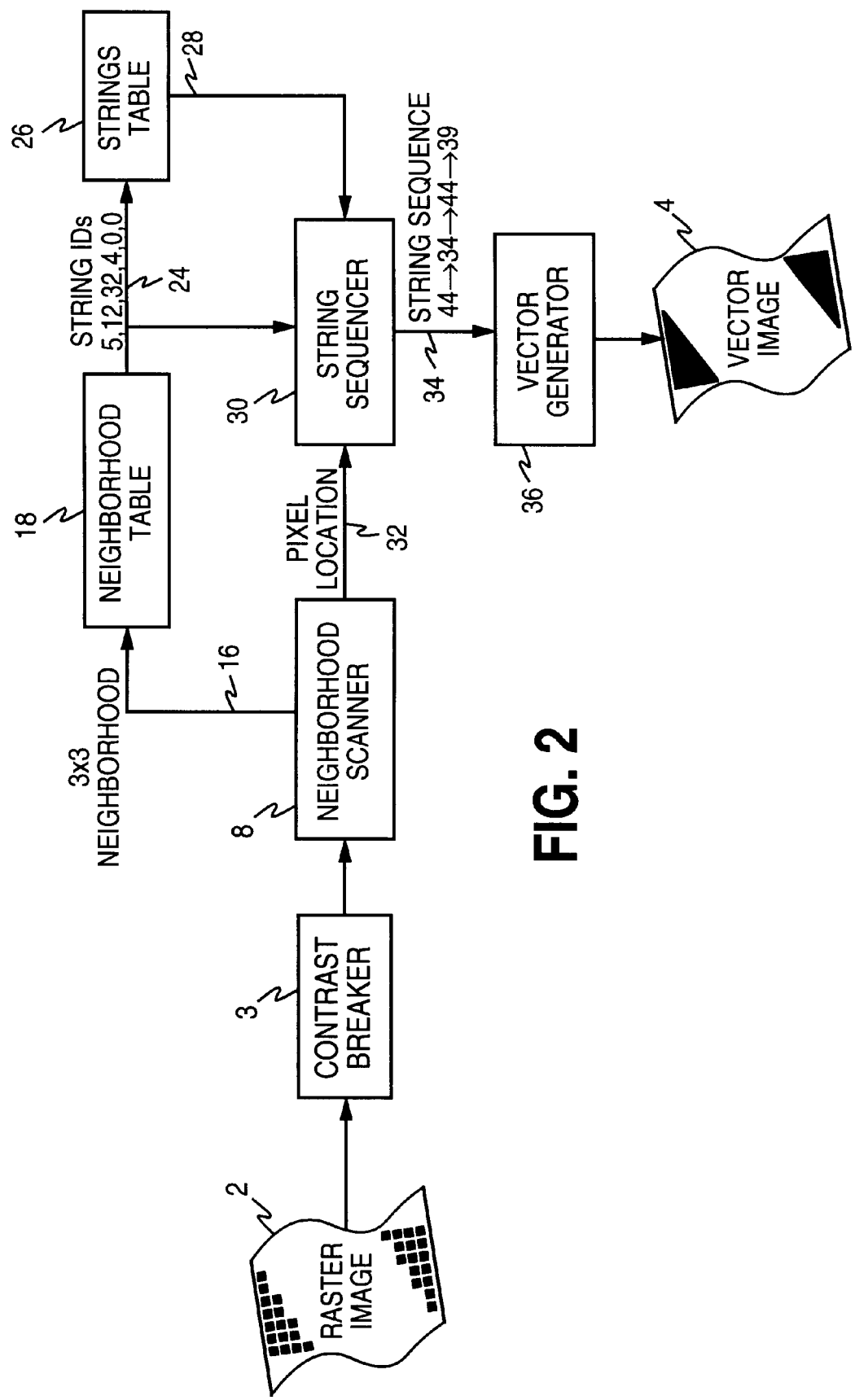
FIG. 2 is a block diagram of the elements for defining the color borders of a raster image according to the aspects of the present invention.

FIG. 2 shows a block diagram of the elements used to define the color borders of a raster image according to the aspects of the present invention. The raster image data 2 that is to be converted into a vector format 4 can come from many different alternative sources. For example, it may be generated by illuminating a photograph with a light source and detecting the reflected light with a charge-coupled-device (CCD). A CCD is typically formed of an array of individual photosensitive cells which detect an intensity or brightness of the light. Thus, the output of the CCD is an array of pixels which represent a portion of the raster image bit map. As the light source is scanned over the photograph, the pixels output by the CCD are concatenated to form the entire raster image. Color in the photograph can be detected by employing red-green-blue (RGB) filters in front of three respective CCDs, and then combining the outputs of the CCDs into an n-bit pixel that can represent one of $2^n$ colors.

The aspects of the present invention are not limited to raster images that represent photographs. The present invention can also convert other digitized signals, such as audio or communication signals, into a vector format for more efficient and effective processing by computers. Such signals are typically generated by a transducer (e.g., a microphone, antenna, recording head, etc.) which senses and transduces into an electrical signal some physical manifestation, such as an acoustic or electromagnetic wave. Typically, the electrical signal is then digitized and converted into a raster format using an analog-to-digital (A/D) converter.

The raster image data 2 processed by the present invention can be generated in real time meaning that the raster data can be converted directly into a vector format as the analog signal is being digitized. Alternatively, the raster image data 2 may be stored on a recording medium, such as a magnetic or optical disc, and processed at a later time by the present invention to define the color borders and ultimately convert the raster data into a vector format.

The raster image data 2, whether processed in real time or read from a storage medium, is processed by a contrast breaker 3 which resolves "contrast ties" in the image features. This aspect of the present invention is described in greater detail below with reference to FIGS. 6–8. After breaking contrast ties, the raster data is input into a neighborhood scanner 8 which scans through the raster data and process the image pixels in a square array referred to as a neighborhood. In the preferred embodiment, the neighborhood represents a 3×3 array of image pixels.

Figure 5A:
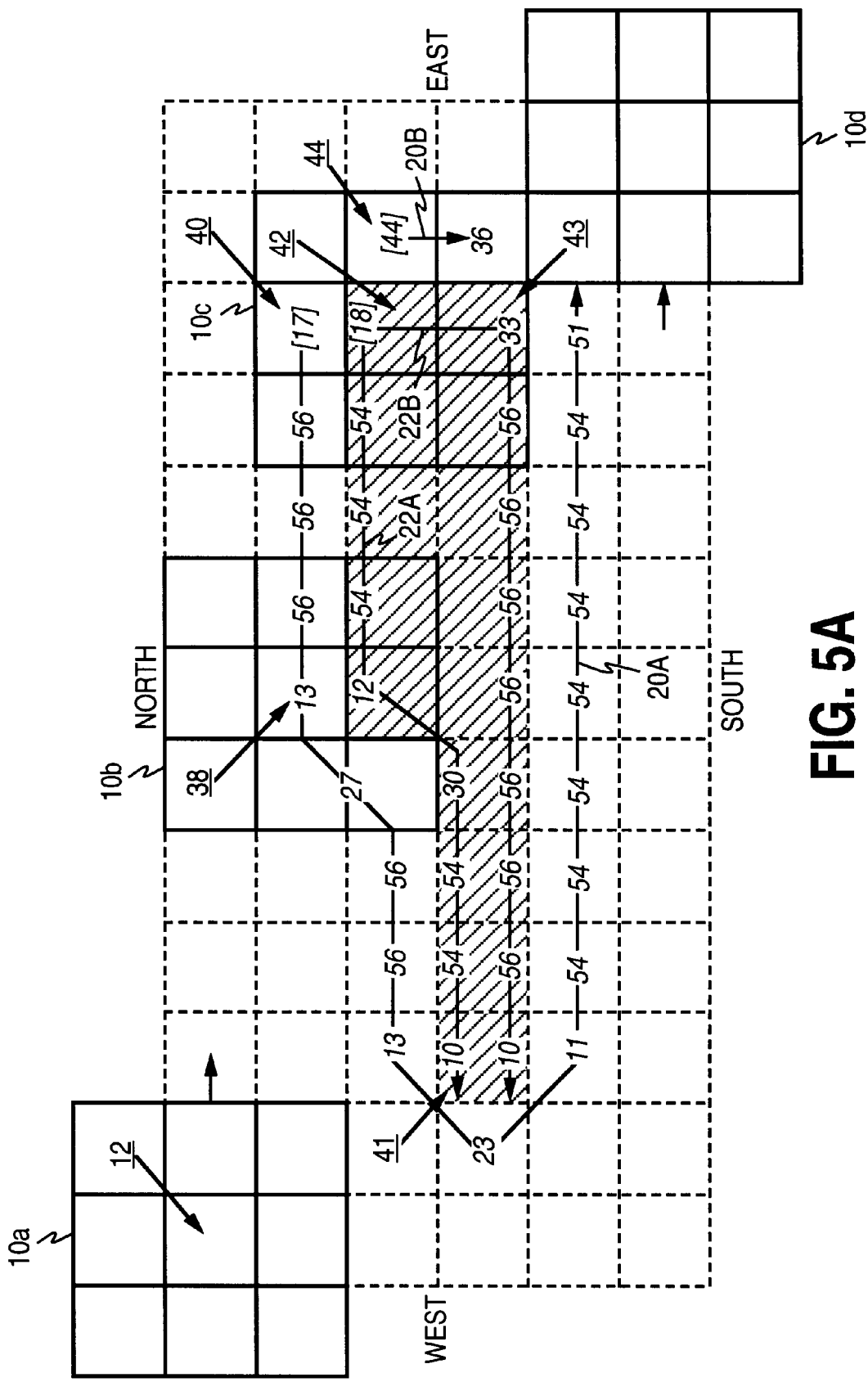
FIG. 5A shows a color raster image comprising a simple feature and the corresponding string sequences generated by the present invention.

The scanning processes is understood with reference to FIG. 5A which shows the pixels of a raster image and a neighborhood 10a overlaying the image such that the first pixel 12 of the image is in the center of the neighborhood 10a (the cells of the neighborhood 10a laying outside the image are assigned the color Y). After processing this array of pixels, the neighborhood 10a is shifted to the right by one pixel so that the next pixel 14 of the image is in the center of the neighborhood 10a. This process continues until the neighborhood has passed over every pixel in the image ending at neighborhood 10d.

Figures 4A, 4B:
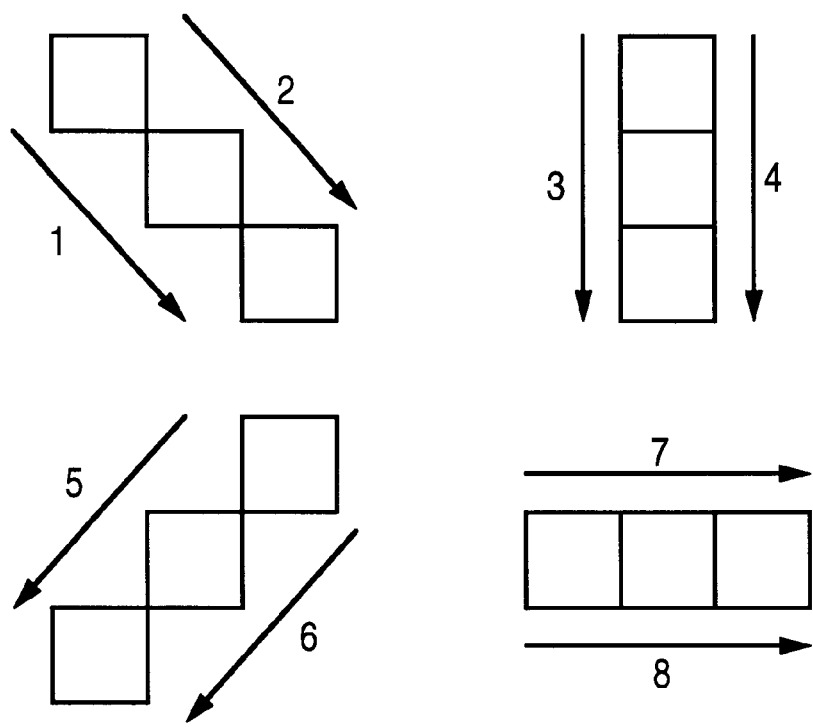
FIG. 4A shows a neighborhood of cells comprising a target cell surrounded by perimeter cells with color values of X, Y, or Z indicating that the color of the representative pixel in the image is either not considered (X), the same color (Y) as the pixel represented by the target cell, or a different color (Z) than the pixel representing the target cell.
FIG. 4B shows the possible slope values for the send and receive slopes of a surface string.

In the present invention, the neighborhood of pixels are not processed directly as in the prior art. Instead, the pixels are converted into corresponding cells which comprise a color value as shown in FIG. 4A. The neighborhood of cells comprises a target cell (in this case the center cell) denoted T and a number of perimeter cells denoted $P_{0-7}$. The color values that can be assigned to each cell are Y and Z. The color Y indicates that the color of the pixel represented by the cell is the same color as the pixel represented by the target cell (the color of the target cell T is always Y), and the color Z indicates that the color of the pixel represented by the cell has a different color than the pixel represented by the target cell. Thus, in a 3×3 array of cells with the target cell always having a color value of Y, there are $2^8$ or 256 different possible color combinations for the perimeter cells $P_{0-7}$.

Referring again to FIG. 2, the neighborhood of cells 16 generated for each pixel in the image is used as an address into a neighborhood lookup table 18. The content of the neighborhood lookup table is shown below:

Neighborhood Lookup Table

| SURFACE STRINGS | ADR | $P_0P_1P_2$ | $P_3 T P_4$ | $P_5P_6P_7$ |
|---|---|---|---|---|
| 00,00,00,00,00,00; | 0 | Z Z Z | Z Y Z | Z Z Z |
| 01,02,00,00,00,00; | 1 | Z Z Z | Z Y Z | Z Z Y |
| 03,04,00,00,00,00; | 2 | Z Z Z | Z Y Z | Z Y Z |
| 03,02,00,00,00,00; | 3 | Z Z Z | Z Y Z | Z Y Y |
| 05,06,00,00,00,00; | 4 | Z Z Z | Z Y Z | Y Z Z |
| 05,07,46,02,00,00; | 5 | Z Z Z | Z Y Z | Y Z Y |
| 05,04,00,00,00,00; | 6 | Z Z Z | Z Y Z | Y Y Z |
| 05,02,00,00,00,00; | 7 | Z Z Z | Z Y Z | Y Y Y |
| 10,00,00,00,00,00; | 8 | Z Z Z | Z Y Y | Z Z Z |
| 09,00,00,00,00,00; | 9 | Z Z Z | Z Y Y | Z Z Y |
| 15,00,00,00,00,00; | 10 | Z Z Z | Z Y Y | Z Y Z |
| 15,00,00,00,00,00; | 11 | Z Z Z | Z Y Y | Z Y Y |
| 12,13,00,00,00,00; | 12 | Z Z Z | Z Y Y | Y Z Z |
| 12,07,46,00,00,00; | 13 | Z Z Z | Z Y Y | Y Z Y |
| 12,00,00,00,00,00; | 14 | Z Z Z | Z Y Y | Y Y Z |
| 12,00,00,00,00,00; | 15 | Z Z Z | Z Y Y | Y Y Y |
| 14,00,00,00,00,00; | 16 | Z Z Z | Y Y Z | Z Z Z |
| 17,16,00,00,00,00; | 17 | Z Z Z | Y Y Z | Z Z Y |
| 18,00,00,00,00,00; | 18 | Z Z Z | Y Y Z | Z Y Z |
| 16,00,00,00,00,00; | 19 | Z Z Z | Y Y Z | Z Y Y |
| 41,00,00,00,00,00; | 20 | Z Z Z | Y Y Z | Y Z Z |
| 07,46,16,00,00,00; | 21 | Z Z Z | Y Y Z | Y Z Y |
| 18,00,00,00,00,00; | 22 | Z Z Z | Y Y Z | Y Y Z |
| 16,00,00,00,00,00; | 23 | Z Z Z | Y Y Z | Y Y Y |
| 56,54,00,00,00,00; | 24 | Z Z Z | Y Y Y | Z Z Z |
| 17,54,00,00,00,00; | 25 | Z Z Z | Y Y Y | Z Z Y |
| 54,00,00,00,00,00; | 26 | Z Z Z | Y Y Y | Z Y Z |
| 54,00,00,00,00,00; | 27 | Z Z Z | Y Y Y | Z Y Y |
| 13,54,00,00,00,00; | 28 | Z Z Z | Y Y Y | Y Z Z |
| 07,46,54,00,00,00; | 29 | Z Z Z | Y Y Y | Y Z Y |
| 54,00,00,00,00,00; | 30 | Z Z Z | Y Y Y | Y Y Z |
| 54,00,00,00,00,00; | 31 | Z Z Z | Y Y Y | Y Y Y |
| 20,21,00,00,00,00; | 32 | Z Z Y | Z Y Z | Z Z Z |
| 22,23,00,00,00,00; | 33 | Z Z Y | Z Y Z | Z Z Y |
| 24,25,00,00,00,00; | 34 | Z Z Y | Z Y Z | Z Y Z |
| 24,23,00,00,00,00; | 35 | Z Z Y | Z Y Z | Z Y Y |
| 53,48,00,00,00,00; | 36 | Z Z Y | Z Y Z | Y Z Z |
| 53,07,46,23,00,00; | 37 | Z Z Y | Z Y Z | Y Z Y |
| 53,25,00,00,00,00; | 38 | Z Z Y | Z Y Z | Y Y Z |
| 53,23,00,00,00,00; | 39 | Z Z Y | Z Y Z | Y Y Y |
| 28,00,00,00,00,00; | 40 | Z Z Y | Z Y Y | Z Z Z |
| 22,00,00,00,00,00; | 41 | Z Z Y | Z Y Y | Z Z Y |
| 24,00,00,00,00,00; | 42 | Z Z Y | Z Y Y | Z Y Z |
| 24,00,00,00,00,00; | 43 | Z Z Y | Z Y Y | Z Y Y |
| 53,13,00,00,00,00; | 44 | Z Z Y | Z Y Y | Y Z Z |
| 53,07,46,00 00,00; | 45 | Z Z Y | Z Y Y | Y Z Y |
| 53,00,00,00,00,00; | 46 | Z Z Y | Z Y Y | Y Y Z |
| 53,00,00,00,00,00; | 47 | Z Z Y | Z Y Y | Y Y Y |
| 30,27,00,00,00,00; | 48 | Z Z Y | Y Y Z | Z Z Z |
| 30,23,17,00,00,00; | 49 | Z Z Y | Y Y Z | Z Z Y |
| 30,25,00,00,00,00; | 50 | Z Z Y | Y Y Z | Z Y Z |
| 30,23,00,00,00,00; | 51 | Z Z Y | Y Y Z | Z Y Y |
| 30,48,00,00,00,00; | 52 | Z Z Y | Y Y Z | Y Z Z |
| 30,07,46,23,00,00; | 53 | Z Z Y | Y Y Z | Y Z Y |
| 30,25,00,00,00,00; | 54 | Z Z Y | Y Y Z | Y Y Z |
| 30,23,00,00,00,00; | 55 | Z Z Y | Y Y Z | Y Y Y |
| 30,56,00,00,00,00; | 56 | Z Z Y | Y Y Y | Z Z Z |
| 30,17,00,00,00,00; | 57 | Z Z Y | Y Y Y | Z Z Y |
| 30,00,00,00,00,00; | 58 | Z Z Y | Y Y Y | Z Y Z |
| 30,00,00,00,00,00; | 59 | Z Z Y | Y Y Y | Z Y Y |
| 30,13,00,00,00,00; | 60 | Z Z Y | Y Y Y | Y Z Z |
| 30,07,46,00,00,00; | 61 | Z Z Y | Y Y Y | Y Z Y |
| 30,00,00,00,00,00; | 62 | Z Z Y | Y Y Y | Y Y Z |
| 30,00,00,00,00,00; | 63 | Z Z Y | Y Y Y | Y Y Y |
| 32,52,00,00,00,00; | 64 | Z Y Z | Z Y Z | Z Z Z |
| 34,35,00,00,00,00; | 65 | Z Y Z | Z Y Z | Z Z Y |
| 58,57,00,00,00,00; | 66 | Z Y Z | Z Y Z | Z Y Z |
| 58,35,00,00,00,00; | 67 | Z Y Z | Z Y Z | Z Y Y |
| 36,37,00,00,00,00; | 68 | Z Y Z | Z Y Z | Y Z Z |
| 36,07,46,35,00,00; | 69 | Z Y Z | Z Y Z | Y Z Y |
| 36,57,00,00,00,00; | 70 | Z Y Z | Z Y Z | Y Y Z |
| 36,35,00,00,00,00; | 71 | Z Y Z | Z Y Z | Y Y Y |
| 38,00,00,00,00,00; | 72 | Z Y Z | Z Y Y | Z Z Z |
| 34,00,00,00,00,00; | 73 | Z Y Z | Z Y Y | Z Z Y |
| 58,00,00,00,00,00; | 74 | Z Y Z | Z Y Y | Z Y Z |
| 58,00,00,00,00,00; | 75 | Z Y Z | Z Y Y | Z Y Y |
| 36,13,00,00,00,00; | 76 | Z Y Z | Z Y Y | Y Z Z |
| 36,07,46,00,00,00; | 77 | Z Y Z | Z Y Y | Y Z Y |
| 36,00,00,00,00,00; | 78 | Z Y Z | Z Y Y | Y Y Z |
| 36,00,00,00,00,00; | 79 | Z Y Z | Z Y Y | Y Y Y |
| 33,00,00,00,00,00; | 80 | Z Y Z | Y Y Z | Z Z Z |
| 17,35,00,00,00,00; | 81 | Z Y Z | Y Y Z | Z Z Y |
| 57,00,00,00,00,00; | 82 | Z Y Z | Y Y Z | Z Y Z |
| 35,00,00,00,00,00; | 83 | Z Y Z | Y Y Z | Z Y Y |
| 37,00,00,00,00,00; | 84 | Z Y Z | Y Y Z | Y Z Z |
| 07,46,35,00,00,00; | 85 | Z Y Z | Y Y Z | Y Z Y |
| 57,00,00,00,00,00; | 86 | Z Y Z | Y Y Z | Y Y Z |
| 35,00,00,00,00,00; | 87 | Z Y Z | Y Y Z | Y Y Y |
| 56,00,00,00,00,00; | 88 | Z Y Z | Y Y Y | Z Z Z |
| 17,00,00,00,00,00; | 89 | Z Y Z | Y Y Y | Z Z Y |
| 00,00,00,00,00,00; | 90 | Z Y Z | Y Y Y | Z Y Z |
| 00,00,00,00,00,00; | 91 | Z Y Z | Y Y Y | Z Y Y |
| 13,00,00,00,00 00; | 92 | Z Y Z | Y Y Y | Y Z Z |
| 07,46,00,00,00,00; | 93 | Z Y Z | Y Y Y | Y Z Y |
| 00,00,00,00,00,00; | 94 | Z Y Z | Y Y Y | Y Y Z |
| 00,00,00,00,00,00; | 95 | Z Y Z | Y Y Y | Y Y Y |
| 32,21,00,00,00,00; | 96 | Z Y Y | Z Y Z | Z Z Z |
| 34,23,00,00,00,00; | 97 | Z Y Y | Z Y Z | Z Z Y |
| 58,25,00 00,00,00; | 98 | Z Y Y | Z Y Z | Z Y Z |
| 58,23,00,00,00,00; | 99 | Z Y Y | Z Y Z | Z Y Y |
| 36,48,00,00,00,00; | 100 | Z Y Y | Z Y Z | Y Z Z |

-continued

Neighborhood Lookup Table

| SURFACE STRINGS | ADR | $P_0P_1P_2$ | $P_3 T P_4$ | $P_5P_6P_7$ |
|---|---|---|---|---|
| 36,07,46,23,00,00; | 101 | Z Y Y | Z Y Z | Y Z Y |
| 36,25,00,00,00,00; | 102 | Z Y Y | Z Y Z | Y Y Y |
| 36,23,00,00,00,00; | 103 | Z Y Y | Z Y Z | Y Y Y |
| 38,00,00,00,00,00; | 104 | Z Y Y | Z Y Y | Z Z Z |
| 34,00,00,00,00,00; | 105 | Z Y Y | Z Y Y | Z Z Y |
| 58,00,00,00,00,00; | 106 | Z Y Y | Z Y Y | Z Y Z |
| 58,00,00,00,00,00; | 107 | Z Y Y | Z Y Y | Z Y Y |
| 36,13,00,00,00,00; | 108 | Z Y Y | Z Y Y | Y Z Z |
| 36,07,46,00,00,00; | 109 | Z Y Y | Z Y Y | Y Z Y |
| 36,00,00,00,00,00; | 110 | Z Y Y | Z Y Y | Y Y Z |
| 36,00,00,00,00,00; | 111 | Z Y Y | Z Y Y | Y Y Y |
| 27,00,00,00,00,00; | 112 | Z Y Y | Y Y Z | Z Z Z |
| 17,23,00,00,00,00; | 113 | Z Y Y | Y Y Z | Z Z Y |
| 25,00,00,00,00,00; | 114 | Z Y Y | Y Y Z | Z Y Z |
| 23,00,00,00,00,00; | 115 | Z Y Y | Y Y Z | Z Y Y |
| 48,00,00,00,00,00; | 116 | Z Y Y | Y Y Z | Y Z Z |
| 07,46,23,00,00,00; | 117 | Z Y Y | Y Y Z | Y Z Y |
| 25,00,00,00,00,00; | 118 | Z Y Y | Y Y Z | Y Y Z |
| 23,00,00,00,00,00; | 119 | Z Y Y | Y Y Z | Y Y Y |
| 56,00,00,00,00,00; | 120 | Z Y Y | Y Y Y | Z Z Z |
| 17,00,00,00,00,00; | 121 | Z Y Y | Y Y Y | Z Z Y |
| 00,00,00,00,00,00; | 122 | Z Y Y | Y Y Y | Z Y Z |
| 00,00,00,00,00,00; | 123 | Z Y Y | Y Y Y | Z Y Y |
| 13,00,00,00,00,00; | 124 | Z Y Y | Y Y Y | Y Z Z |
| 07,46,00,00,00,00; | 125 | Z Y Y | Y Y Y | Y Z Y |
| 00,00,00,00,00,00; | 126 | Z Y Y | Y Y Y | Y Y Z |
| 00,00,00,00,00,00; | 127 | Z Y Y | Y Y Y | Y Y Y |
| 42,43,00,00,00,00; | 128 | Y Z Z | Z Y Z | Z Z Z |
| 47,45,00,00,00,00; | 129 | Y Z Z | Z Y Z | Z Z Y |
| 44,40,00,00,00,00; | 130 | Y Z Z | Z Y Z | Z Y Z |
| 44,45,00,00,00,00; | 131 | Y Z Z | Z Y Z | Z Y Y |
| 39,31,00,00,00,00; | 132 | Y Z Z | Z Y Z | Y Z Z |
| 39,07,46,45,00,00; | 133 | Y Z Z | Z Y Z | Y Z Y |
| 39,40,00,00,00,00; | 134 | Y Z Z | Z Y Z | Y Y Z |
| 39,45,00,00,00,00; | 135 | Y Z Z | Z Y Z | Y Y Y |
| 29,11,00,00,00,00; | 136 | Y Z Z | Z Y Y | Z Z Z |
| 47,11,00,00,00,00; | 137 | Y Z Z | Z Y Y | Z Z Y |
| 44,11,00,00,00,00; | 138 | Y Z Z | Z Y Y | Z Y Z |
| 44,11,00,00,00,00; | 139 | Y Z Z | Z Y Y | Z Y Y |
| 39,13,11,00,00,00; | 140 | Y Z Z | Z Y Y | Y Z Z |
| 39,07,46,11,00,00; | 141 | Y Z Z | Z Y Y | Y Z Y |
| 39,11,00,00,00,00; | 142 | Y Z Z | Z Y Y | Y Y Z |
| 39,11,00,00,00,00; | 143 | Y Z Z | Z Y Y | Y Y Y |
| 19,00,00,00,00,00; | 144 | Y Z Z | Y Y Z | Z Z Z |
| 17,45,00,00,00,00; | 145 | Y Z Z | Y Y Z | Z Z Y |
| 40,00,00,00,00,00; | 146 | Y Z Z | Y Y Z | Z Y Z |
| 45,00,00,00,00,00; | 147 | Y Z Z | Y Y Z | Z Y Y |
| 31,00,00,00,00,00; | 148 | Y Z Z | Y Y Z | Y Z Z |
| 07,46,45,00,00,00; | 149 | Y Z Z | Y Y Z | Y Z Y |
| 40,00,00,00,00,00; | 150 | Y Z Z | Y Y Z | Y Y Z |
| 45,00,00,00,00,00; | 151 | Y Z Z | Y Y Z | Y Y Y |
| 11,56,00,00,00,00; | 152 | Y Z Z | Y Y Y | Z Z Z |
| 17,11,00,00,00,00; | 153 | Y Z Z | Y Y Y | Z Z Y |
| 11,00,00,00,00,00; | 154 | Y Z Z | Y Y Y | Z Y Z |
| 11,00,00,00,00,00; | 155 | Y Z Z | Y Y Y | Z Y Y |
| 13,11,00,00,00 00; | 156 | Y Z Z | Y Y Y | Y Z Z |
| 07,46,11,00,00,00; | 157 | Y Z Z | Y Y Y | Y Z Y |
| 11,00,00,00,00,00; | 158 | Y Z Z | Y Y Y | Y Y Z |
| 11,00,00,00,00,00; | 159 | Y Z Z | Y Y Y | Y Y Y |
| 42,08,26,21,00,00; | 160 | Y Z Y | Z Y Z | Z Z Z |
| 47,08,26,23,00,00; | 161 | Y Z Y | Z Y Z | Z Z Y |
| 44,08,26,25,00,00; | 162 | Y Z Y | Z Y Z | Z Y Z |
| 44,08,26,23 00,00; | 163 | Y Z Y | Z Y Z | Z Y Y |
| 39,08,26,48,00,00; | 164 | Y Z Y | Z Y Z | Y Z Z |
| 39,08,26,07,46,23; | 165 | Y Z Y | Z Y Z | Y Z Y |
| 39,08,26,25,00,00; | 166 | Y Z Y | Z Y Z | Y Y Z |
| 39,08,26,23,00,00; | 167 | Y Z Y | Z Y Z | Y Y Y |
| 29,08,26,00,00,00; | 168 | Y Z Y | Z Y Y | Z Z Z |
| 47,08,26,00,00,00; | 169 | Y Z Y | Z Y Y | Z Z Y |
| 44,08,26,00,00,00; | 170 | Y Z Y | Z Y Y | Z Y Z |
| 44,08,26,00,00,00; | 171 | Y Z Y | Z Y Y | Z Y Y |
| 39,08,26,13,00,00; | 172 | Y Z Y | Z Y Y | Y Z Z |
| 39,08,26,07,46,00; | 173 | Y Z Y | Z Y Y | Y Z Y |
| 39,08,26,00,00,00; | 174 | Y Z Y | Z Y Y | Y Y Z |
| 39,08,26,00,00,00; | 175 | Y Z Y | Z Y Y | Y Y Y |
| 08,26,27,00,00,00; | 176 | Y Z Y | Y Y Z | Z Z Z |
| 08,26,17,23,00,00; | 177 | Y Z Y | Y Y Z | Z Z Y |
| 08,26,25,00,00,00; | 178 | Y Z Y | Y Y Z | Z Y Z |
| 08,26,23,00,00,00; | 179 | Y Z Y | Y Y Z | Z Y Y |
| 08,26,48,00,00,00; | 180 | Y Z Y | Y Y Z | Y Z Z |
| 08,26,07,46,23,00; | 181 | Y Z Y | Y Y Z | Y Z Y |
| 08,26,25,00,00,00; | 182 | Y Z Y | Y Y Z | Y Y Z |
| 08,26,23,00,00,00; | 183 | Y Z Y | Y Y Z | Y Y Y |
| 08,26,56,00,00,00; | 184 | Y Z Y | Y Y Y | Z Z Z |
| 08,26,17,00,00,00; | 185 | Y Z Y | Y Y Y | Z Z Y |
| 08,26,00,00,00,00; | 186 | Y Z Y | Y Y Y | Z Y Z |
| 08,26,00,00 00,00; | 187 | Y Z Y | Y Y Y | Z Y Y |
| 08,26,13,00,00,00; | 188 | Y Z Y | Y Y Y | Y Z Z |
| 08,26,07,46,00,00; | 189 | Y Z Y | Y Y Y | Y Z Y |
| 08,26,00,00,00,00; | 190 | Y Z Y | Y Y Y | Y Y Z |
| 08,26,00,00,00,00; | 191 | Y Z Y | Y Y Y | Y Y Y |
| 42,52,00,00,00,00; | 192 | Y Y Z | Z Y Z | Z Z Z |
| 47,35,00,00,00,00; | 193 | Y Y Z | Z Y Z | Z Z Y |
| 44,57,00,00,00,00; | 194 | Y Y Z | Z Y Z | Z Y Z |
| 44,35,00,00,00,00; | 195 | Y Y Z | Z Y Z | Z Y Y |
| 39,37,00,00,00,00; | 196 | Y Y Z | Z Y Z | Y Z Z |
| 39,07,46,35,00,00; | 197 | Y Y Z | Z Y Z | Y Z Y |
| 39,57,00,00,00,00; | 198 | Y Y Z | Z Y Z | Y Y Z |
| 39,35,00,00,00,00; | 199 | Y Y Z | Z Y Z | Y Y Y |
| 29,00,00,00,00,00; | 200 | Y Y Z | Z Y Y | Z Z Z |
| 47,00,00,00,00,00; | 201 | Y Y Z | Z Y Y | Z Z Y |
| 44,00,00,00,00,00; | 202 | Y Y Z | Z Y Y | Z Y Z |
| 44,00,00,00,00,00; | 203 | Y Y Z | Z Y Y | Z Y Y |
| 39,13,00,00,00,00; | 204 | Y Y Z | Z Y Y | Y Z Z |
| 39,07,46,00,00,00; | 205 | Y Y Z | Z Y Y | Y Z Y |
| 39,00,00,00,00,00; | 206 | Y Y Z | Z Y Y | Y Y Z |
| 39,00,00,00,00,00; | 207 | Y Y Z | Z Y Y | Y Y Y |
| 33,00,00,00,00,00; | 208 | Y Y Z | Y Y Z | Z Z Z |
| 17,35,00,00,00,00; | 209 | Y Y Z | Y Y Z | Z Z Y |
| 57,00,00,00,00,00; | 210 | Y Y Z | Y Y Z | Z Y Z |
| 35,00,00,00,00,00; | 211 | Y Y Z | Y Y Z | Z Y Y |
| 37,00,00,00,00,00; | 212 | Y Y Z | Y Y Z | Y Z Z |
| 07,46,35,00,00,00; | 213 | Y Y Z | Y Y Z | Y Z Y |
| 57,00,00,00,00,00; | 214 | Y Y Z | Y Y Z | Y Y Z |
| 35,00,00,00,00,00; | 215 | Y Y Z | Y Y Z | Y Y Y |
| 56,00,00,00,00,00; | 216 | Y Y Z | Y Y Y | Z Z Z |
| 17,00,00,00,00,00; | 217 | Y Y Z | Y Y Y | Z Z Y |
| 00,00,00,00,00,00; | 218 | Y Y Z | Y Y Y | Z Y Z |
| 00,00,00,00,00,00; | 219 | Y Y Z | Y Y Y | Z Y Y |
| 13,00,00,00,00,00; | 220 | Y Y Z | Y Y Y | Y Z Z |
| 07,46,00,00,00,00; | 221 | Y Y Z | Y Y Y | Y Z Y |
| 00,00,00,00,00,00; | 222 | Y Y Z | Y Y Y | Y Y Z |
| 00,00,00,00,00,00; | 223 | Y Y Z | Y Y Y | Y Y Y |
| 42,21,00,00,00,00; | 224 | Y Y Y | Z Y Z | Z Z Z |
| 47,23,00,00,00,00; | 225 | Y Y Y | Z Y Z | Z Z Y |
| 44,25,00,00,00,00; | 226 | Y Y Y | Z Y Z | Z Y Z |
| 44,23,00,00,00,00; | 227 | Y Y Y | Z Y Z | Z Y Y |
| 39,48,00,00,00,00; | 228 | Y Y Y | Z Y Z | Y Z Z |
| 39,07,46,23,00,00; | 229 | Y Y Y | Z Y Z | Y Z Y |
| 39,25,00,00,00,00; | 230 | Y Y Y | Z Y Z | Y Y Z |
| 39,23,00,00,00,00; | 231 | Y Y Y | Z Y Z | Y Y Y |
| 29,00,00,00,00,00; | 232 | Y Y Y | Z Y Y | Z Z Z |
| 47,00,00,00,00,00; | 233 | Y Y Y | Z Y Y | Z Z Y |
| 44,00,00,00,00,00; | 234 | Y Y Y | Z Y Y | Z Y Z |
| 44,00,00,00,00,00; | 235 | Y Y Y | Z Y Y | Z Y Y |
| 39,13,00,00,00,00; | 236 | Y Y Y | Z Y Y | Y Z Z |
| 39,07,46,00,00,00; | 237 | Y Y Y | Z Y Y | Y Z Y |
| 39,00,00,00,00,00; | 238 | Y Y Y | Z Y Y | Y Y Z |
| 39,00,00,00,00,00; | 239 | Y Y Y | Z Y Y | Y Y Y |
| 27,00,00,00,00,00; | 240 | Y Y Y | Y Y Z | Z Z Z |
| 17,23,00,00,00,00; | 241 | Y Y Y | Y Y Z | Z Z Y |
| 25,00,00,00,00,00; | 242 | Y Y Y | Y Y Z | Z Y Z |
| 23,00,00,00,00,00; | 243 | Y Y Y | Y Y Z | Z Y Y |
| 48,00,00,00,00,00; | 244 | Y Y Y | Y Y Z | Y Z Z |
| 07,46,23,00,00,00; | 245 | Y Y Y | Y Y Z | Y Z Y |
| 25,00,00,00,00,00; | 246 | Y Y Y | Y Y Z | Y Y Z |
| 23,00,00,00,00,00; | 247 | Y Y Y | Y Y Z | Y Y Y |
| 56,00,00,00,00,00; | 248 | Y Y Y | Y Y Y | Z Z Z |

Neighborhood Lookup Table

| SURFACE STRINGS | ADR | $P_0P_1P_2$ | $P_3 T P_4$ | $P_5P_6P_7$ |
|---|---|---|---|---|
| 17,00,00,00,00,00; | 249 | Y Y Y | Y Y Y | Z Z Y |
| 00,00,00,00,00,00; | 250 | Y Y Y | Y Y Y | Z Y Z |
| 00,00,00,00,00,00; | 251 | Y Y Y | Y Y Y | Z Y Y |
| 13,00,00,00,00,00; | 252 | Y Y Y | Y Y Y | Y Z Z |
| 07,46,00,00,00,00; | 253 | Y Y Y | Y Y Y | Y Z Y |
| 00,00 00,00,00,00; | 254 | Y Y Y | Y Y Y | Y Y Z |
| 00,00,00,00,00,00; | 255 | Y Y Y | Y Y Y | Y Y Y |

In the above table, the Y and Z color values for the neighborhood cells are shown in the right hand columns. The corresponding binary address represented by a particular color combination of the permitter cells $P_{0-7}$ is shown in the middle column denoted ADR. In other words, each of the 256 possible color combinations for the perimeter cells $P_{0-7}$ generates a binary addresses into the neighborhood lookup table 18. For each color combination or address, the neighborhood table outputs a string ID for up to six different surface strings as shown in the left column (as describe below, there are 58 different surface strings). The ordering of the surface strings in each entry of the above table is significant. As explained below, the surface strings are linked together into a string sequence; by ordering the surface strings as shown in each entry of the above table, the linking process is simplified.

Figure 3:
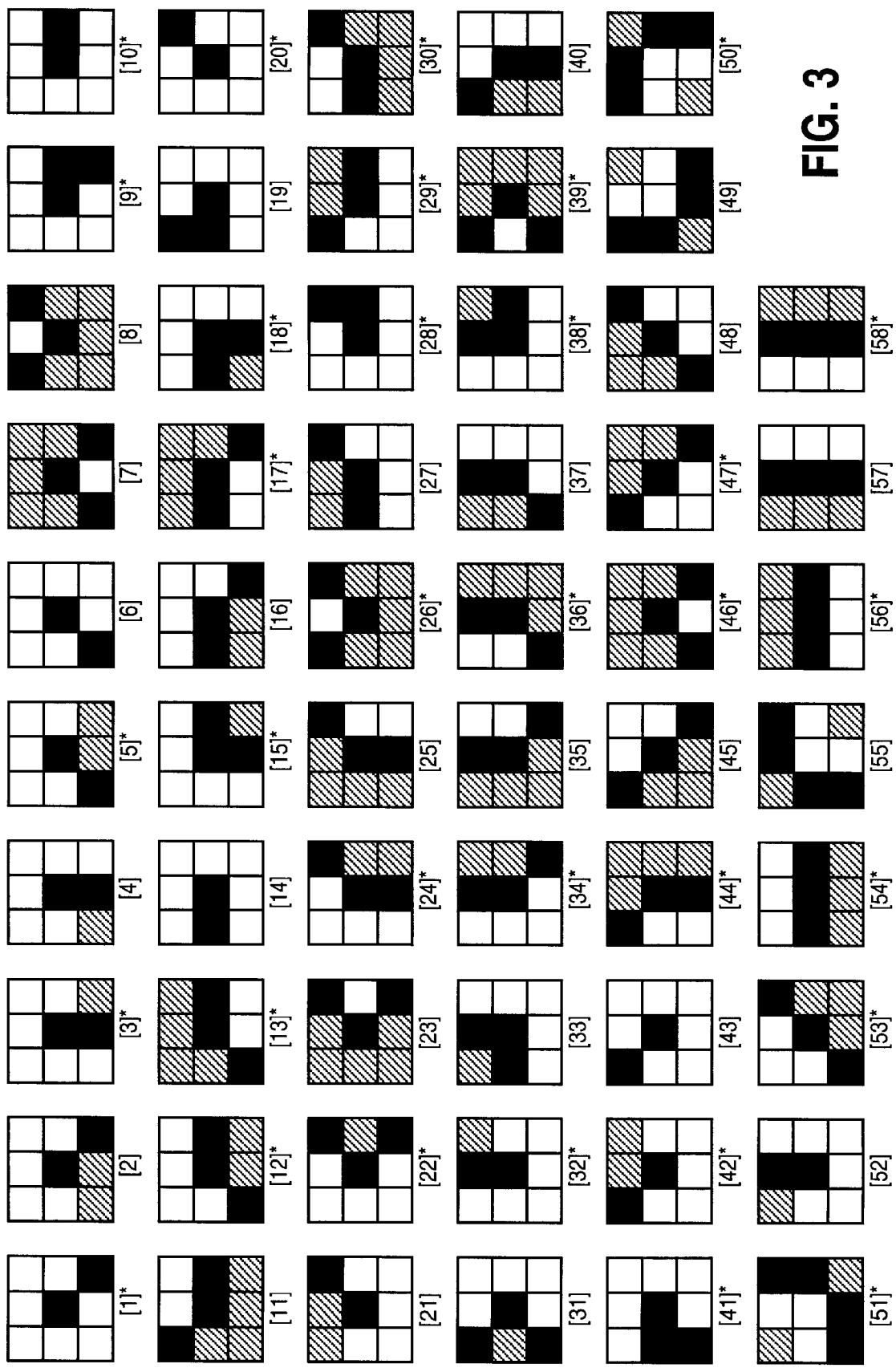
FIG. 3 shows an exhaustive set of surface strings corresponding to a neighborhood of cells representing pixels of the raster image, wherein the surface strings are connected into a string sequence to define a color border.

A surface string defines the general slope of a color border passing through a given neighborhood of cells. It is possible that six different color borders will pass through a single neighborhood of cells which is why the neighborhood lookup table 18 outputs up to six different surface strings for any given neighborhood 16. FIG. 3 shows the 58 different surface strings provided in the present invention which, as far as is known to the applicant, define every possible permutation of a color border in a raster image. The 58 surface strings shown in FIG. 3 were generated through an exhaustive, heuristic search that required many man hours to complete; the set of surface strings in FIG. 3 is a significant aspect of the present invention.

The cell coloring in each surface string shown in FIG. 3 denotes the above-described color value (Y or Z) for each cell. The black cells represent the color Y, the white cells represent the color Z, and the shaded cells represent the color X which means the color of the cell is ignored (i.e., the cell color could be either Y or Z). Referring again to the above neighborhood lookup table, the entry corresponding to neighborhood address 69 is:

| SURFACE STRINGS | ADR | $P_0P_1P_2$ | $P_3 T P_4$ | $P_5P_6P_7$ |
|---|---|---|---|---|
| 36,07,46,35,00,00; | 69 | Z Y Z | Z Y Z | Y Z Y |

The color code for the first surface string of the above entry, surface string 36, is shown in FIG. 3 to be:

Z Y X | Z Y X | Y X X.

Note that the color code for surface string 36 matches the color code of the neighborhood address 69 except for the don't care color X. A similar color code which matches the color code of neighborhood 69 can be verified for each of the other surface strings (7, 46 and 35) in the above entry.

Each surface string shown in FIG. 3 has associated with it a receive slope and a send slope which define the general slope of a color border as it enters the neighborhood and the general slope as it exits the neighborhood. In the present invention, there are eight possible slope values that can be assigned to the send and receive slope of a surface string. These slope values (1–8) are illustrated in FIG. 4B. Notice that there are two slope values assigned to each slope direction: diagonal, vertical, and horizontal, e.g., the slope values 1 and 2 are assigned to the diagonal direction downward from left to right. The reason two slope values are assigned to each direction is because each color border is either an east or west border.

The concept of east and west color borders is understood from the raster image comprising a simple feature as shown in FIG. 5A. This raster image comprises only two colors, black and white. The feature depicted in the image has associated with it a west 20A and an east 20B white color border, and a west 22A and an east 22B black color border. The west white border corresponding to the east white border 20A is the left edge of the image in FIG. 5A, and the east white border corresponding to the west white border 20B is the right edge of the image in FIG. 5A. Notice that in FIG. 5A the west and east borders begin in pairs, which is always the case in the present invention. West and east borders also always end in pairs, although the borders do not always end with the respective border that it began with. As described in greater detail below, the present invention generates surface strings for both the west and east borders, but the tags for generating vectors are placed only on either of the west or east borders. Both west and east strings sequences are used to place the tags, but the tags are placed only on either the west or east borders.

Referring again to the surface strings shown in FIG. 3, the receive and send slope of each surface string is assigned one of the values shown in FIG. 4B. Consider, for example, the eleventh surface string [11]. This surface string is assigned a receive slope of 2 and a send slope of 7. Similarly, the surface string [17] is assigned a receive slope of 8 and a send slope of 1. As explained in greater detail below, the receive and send slopes are used to connect the surface strings into a string sequence which represents a color border in the image. The first surface string [1] is assigned a receive slope of 0 because string sequences start with this surface string. Similarly, the surface string [8] is assigned a send slope of 0 because string sequences end with this surface string. A lookup table showing each of the 58 surface strings and their corresponding receive and send slopes is shown below:

Surface Strings Table

| $P_0P_1P_2$ | $P_3 T P_4$ | $P_5P_6P_7$ | Strg-ID | Rcv-Slp | Snd-Slp |
|---|---|---|---|---|---|
| Z Z Z | Z Y Z | Z Z Y | 01 | 0 | 1 |
| Z Z Z | Z Y Z | X X Y | 02 | 0 | 2 |
| Z Z Z | Z Y Z | Z Y X | 03 | 0 | 3 |
| Z Z Z | Z Y Z | X Y Z | 04 | 0 | 4 |
| Z Z Z | Z Y Z | Y X X | 05 | 0 | 5 |
| Z Z Z | Z Y Z | Y Z Z | 06 | 0 | 6 |
| X X X | X Y X | Y Z Y | 07 | 0 | 6 |
| Y Z Y | X Y X | X X X | 08 | 2 | 0 |
| Z Z Z | Z Y Y | Z Z Y | 09 | 9 | 1 |

-continued

Surface Strings Table

| $P_0P_1P_2$ | $P_3$ T $P_4$ | $P_5P_6P_7$ | Strg-ID | Rcv-Slp | Snd-Slp |
|---|---|---|---|---|---|
| Z Z Z | Z Y Y | Z Z Z | 10 | 9 | 8 |
| Y Z Z | X Y Y | X X X | 11 | 2 | 7 |
| Z Z Z | Z Y Y | Y X X | 12 | 9 | 5 |
| X X X | X Y Y | Y Z Z | 13 | 10 | 6 |
| Z Z Z | Y Y Z | Z Z Z | 14 | 7 | 10 |
| Z Z Z | Z Y Y | Z Y X | 15 | 9 | 3 |
| Z Z Z | Y Y Z | X X Y | 16 | 7 | 2 |
| X X X | Y Y X | Z Z Y | 17 | 8 | 1 |
| Z Z Z | Y Y Z | X Y Z | 18 | 7 | 4 |
| Y Z Z | Y Y Z | Z Z Z | 19 | 2 | 10 |
| Z Z Y | Z Y Z | Z Z Z | 20 | 5 | 0 |
| X X Y | Z Y Z | Z Z Z | 21 | 6 | 0 |
| Z Z Y | Z Y X | Z Z Y | 22 | 5 | 1 |
| X X Y | X Y Z | X X Y | 23 | 6 | 2 |
| Z Z Y | Z Y X | Z Y X | 24 | 5 | 3 |
| X X Y | X Y Z | X Y Z | 25 | 6 | 4 |
| Y Z Y | X Y X | X X X | 26 | 5 | 0 |
| X X Y | Y Y Z | Z Z Z | 27 | 6 | 10 |
| Z Z Y | Z Y Y | Z Z Z | 28 | 5 | 8 |
| Y X X | Z Y Y | Z Z Z | 29 | 1 | 8 |
| Z Z Y | Y Y X | X X X | 30 | 5 | 9 |
| Y Z Z | X Y Z | Y Z Z | 31 | 2 | 6 |
| Z Y X | Z Y Z | Z Z Z | 32 | 3 | 0 |
| X Y Z | Y Y Z | Z Z Z | 33 | 4 | 10 |
| Z Y X | Z Y X | Z Z Y | 34 | 3 | 1 |
| X Y Z | X Y Z | X X Y | 35 | 4 | 2 |
| Z Y X | Z Y X | Y X X | 36 | 3 | 5 |
| X Y Z | X Y Z | Y Z Z | 37 | 4 | 6 |
| Z Y X | Z Y Y | Z Z Z | 38 | 3 | 8 |
| Y X X | Z Y X | Y X X | 39 | 1 | 5 |
| Y Z Z | X Y Z | X Y Z | 40 | 2 | 4 |
| Z Z Z | Y Y Z | Y Z Z | 41 | 7 | 6 |
| Y X X | Z Y Z | Z Z Z | 42 | 1 | 0 |
| Y Z Z | Z Y Z | Z Z Z | 43 | 2 | 0 |
| Y X X | Z Y X | Z Y X | 44 | 1 | 3 |
| Y Z Z | X Y Z | X X Y | 45 | 2 | 2 |
| X X X | X Y X | Y Z Y | 46 | 0 | 1 |
| Y X X | Z Y X | Z Z Y | 47 | 1 | 1 |
| X X Y | X Y Z | Y Z Z | 48 | 6 | 6 |
| Y Z X | Y Z Z | Y Y Y | 49 | 4 | 7 |
| Y Y Y | Z Z Y | X Z Y | 50 | 8 | 3 |
| X Z Y | Z Z Y | Y Y Y | 51 | 3 | 9 |
| X Y Z | Z Y Z | Z Z Z | 52 | 4 | 0 |
| Z Z Y | Z Y X | Y X X | 5 | 5 | |
| Z Z Z | Y Y Y | X X X | 7 | 7 | |
| Y Y Y | Y Z Z | Y Z X | 55 | 10 | 4 |
| X X X | Y Y Y | Z Z Z | 56 | 8 | 8 |
| X Y Z | X Y Z | X Y Z | 4 | 4 | |
| Z Y X | Z Y X | Z Y X | 58 | 3 | 3 |

In the above table, the left columns represent the color code for each surface string shown in FIG. 3, the middle column is a string ID, and the right columns are the respective receive and send slopes assigned to each surface string. Note that in the above surface strings table there are entries which comprise slopes of 9 and 10. These slopes correspond to the horizontal slopes of 7 and 8 shown in FIG. 4B, only the direction of the slopes are reversed for sequencing surface strings from east to west as described below.

Referring again to FIG. 2, each of the surface string IDs 24 output by the neighborhood lookup table 18 are used as an address into the surface strings table 26 shown above. Notice that surface strings 49, 50, 51 and 55 in the above table are special cases; they are not output by the neighborhood lookup table 18 but instead are generated by combining adjacent surface strings according to the following table:

Special Case Surface Strings Table

| Special Case Strings | Surface Strings Combination |
|---|---|
| 49 | 35,11 |
| 50 | 17,44 |
| 51 | 36,30 |
| 55 | 13,25 |

In the above table, the special case surface strings are generated when the string sequencer 30 of FIG. 2 encounters two adjacent surface strings which make up a special case surface string. An example of when a special case surface string is generated is described below with reference to FIG. 5A.

The surface strings table 26 outputs the receive and send slope 28 for each surface string ID 24 output by the neighborhood lookup table 18. The string sequence 30 then uses the pixel location 32 of the current target pixel, the surface string IDs 24, and the surface string slopes 28 to generate string sequences 34 which define the color borders of the raster image. A string sequence 34 comprises a sequence of connected surface string IDs 24 in an order that follows the contour of the color border. An example of a string sequence 34 is shown in FIG. 2 as comprising the following sequence of surface string IDs: 44->34->44->39. Note that from the above surface strings table and the slopes shown in FIG. 4B, the receive and send slopes of the surface strings in this sequence match. For example, the send slope of string [44] is 3, and the receive slope of string [34] is 3. Referring again to the above neighborhood lookup table, the surface strings in each entry are listed in a particular order such that when the string sequencer 30 processes the surface strings at a given pixel, the surface strings are automatically linked into to the appropriate string sequences without having to check that the send and receive slopes match. Ultimately, the string sequences 34 are processed by a vector generator 36 which places tags on one of the west or east borders which are then used to generate the vectors that make up the vector image 4.

The operation of the string sequencer 30 is understood with reference to FIG. 5A which shows a black and white raster image comprising a simple black feature and the corresponding string sequences that are generated by the present invention. As described above, the neighborhood scanner 8 of FIG. 2 scans a 3×3 neighborhood of cells 10a through the image starting with the first pixel 12. Thus, for the first pixel 12 no surface strings are generated by the neighborhood lookup table 18 because the color code for the neighborhood of cells 10a (YYY YYY YYY) corresponds to address 255 in the above neighborhood lookup table, which has no surface strings for that entry. In fact, a surface string is not generated until the neighborhood of cells reaches pixel 38 where the color code for the neighborhood of cells 10b is (YYY YYY YZZ) corresponding to address 252 in the above neighborhood lookup table which comprises only surface string [13] in that entry. That surface string [13] is the correct and only surface string for this neighborhood 10b can be verified by examining the colors of the neighborhood 10b in FIG. 5A with the colors of surface string [13] shown in FIG. 3.

As described above, the surface string [13] indexes the surface strings table 26 of FIG. 2 which outputs the corresponding receive and send slopes of 10 and 6. The string sequencer 30 processes the location of the pixel 32, the surface string ID[13] 24, and the receive and send slopes 28 in order to sequence the east white border 20A in FIG. 5A. As explained in greater detail below, there are specific priorities that establish where to begin and end a string sequence. In FIG. 5A, the east white border 20A starts with pixel 40 based on these priorities, and sequences around the black feature resulting in a string sequence of:

17->56->56->56->13-> . . . ->51.

The last surface string in the above sequence (surface string [51]) is a "corner" surface string which ends the current string sequence. A string sequence is generated for the black west border 22A starting at pixel 42 and sequencing around the black feature resulting in a string sequence of:

18->54->54->54->12-> . . . ->10.

The above string sequence 22A ends at pixel 41 because surface string [10] is a "protruding corner" surface string which has priority over the "corner" surface string at pixel 43. The surface string priorities are described in greater detail below. When the neighborhood 10c reaches target pixel 42, it begins a string sequence for both the west black border 22A and the east black border 22B. Thus, the resulting string sequence for the east black border 22B is:

18->33->56->56-> . . . ->10.

Similarly, when the neighborhood of cells reaches target pixel 44, the string sequencer 30 begins the string sequence for the west white border 20B and generates the simple string sequence of 44->36.

How the string sequencer 30 of FIG. 2 determines which pixel to begin and end a string sequence is also a significant aspect of the present invention. Basically, the string sequencer 30 operates according to a set of priority rules which are shown in the following table:

| Priority Rules | |
|---|---|
| Surface String | Priority |
| North over South | Highest |
| Protruding Corner | Second Highest |
| Corner | Third Highest |
| Step | Fourth Highest |
| West over East | Lowest |

What the above priority rules mean is that a string sequence will always begin with the surface string representing the most northern pixel and sequence from north to south. If two surface strings represent pixels at the same latitude, then the surface string's type determines the priority. In the above table, "protruding corner" surface strings, which in FIG. 3 are surface strings [9], [10], [14], [19], [28], and [41], have the next highest priority. Next in priority are "corner" surface strings which in FIG. 3 are surface strings [15], [18], [33], and [38], followed by "step" corner strings which in FIG. 3 are surface strings [13], [17], [27], and [29]. The special case surface strings [49], [50], [51] and [55] discussed above are also all corner surface strings. Finally, the lowest priority is to start string sequences with surface strings representing western pixels over eastern pixels. In other words, if two surface strings of the same type represent pixels at the same latitude, then the western surface string has priority over the eastern surface string and the sequencing will progress from west to east.

These priority rules can be understood with reference to FIG. 5A. In evaluating the surface strings of the east white border 20A, the string sequencer 30 of FIG. 2 will begin the string sequence with surface string [17] representing pixel 40 because it is the most northern surface string, and because it is a corner surface string which has priority over the step surface string [13] representing pixel 38. Surface string [17] at pixel 40 is considered a corner surface string because it is adjacent to surface string [44] and the combination of [17] and [44] results in the special case surface string [50] according to the above table (again, the special case surface strings are all corner surface strings).

Thus, when the string sequencer 30 encounters pixel 38, it begins to build a string sequence starting with the step surface string [13] and sequencing from west to east. However, when the string sequencer 30 encounters pixel 40, the string sequence is reversed so that it begins with surface string [17] and sequences from east to west. The string sequence for the east white border 20A continues sequencing around the black feature as shown in FIG. 5A until it reaches surface string [30]. Surface string [30] ends the string sequence because when combined with surface string [36] of the west white border 20B it forms the special case surface string [51] which is a corner surface string. Similarly, the string sequence for the west black border 22A begins with surface string [18] at pixel 42 because it is a corner surface string which has priority over step surface string [12]. The string sequence 22A ends at pixel 41 because surface string [10] is a protruding corner surface string which has priority over the corner surface string [33] at pixel 43.

In the preferred embodiment of the present invention as implemented in the computer source code attached hereto as Appendix A, the string sequencer 30 generates string sequences for both the east and west borders for each feature in the image. However, it has been determined that the vectors can be generated by placing tags only on one of the east or west borders. Both the west and east string sequences are used to place the tags, but the tags are placed only on one of the west or east borders. The 33 surface strings identified by an * in FIG. 3 are surface strings that can be part of a string sequence representing a west border. Notice that some surface strings, such as the corner surface strings [15] and [18], can be part of a string sequence representing either a west or an east border.

Figure 5B:
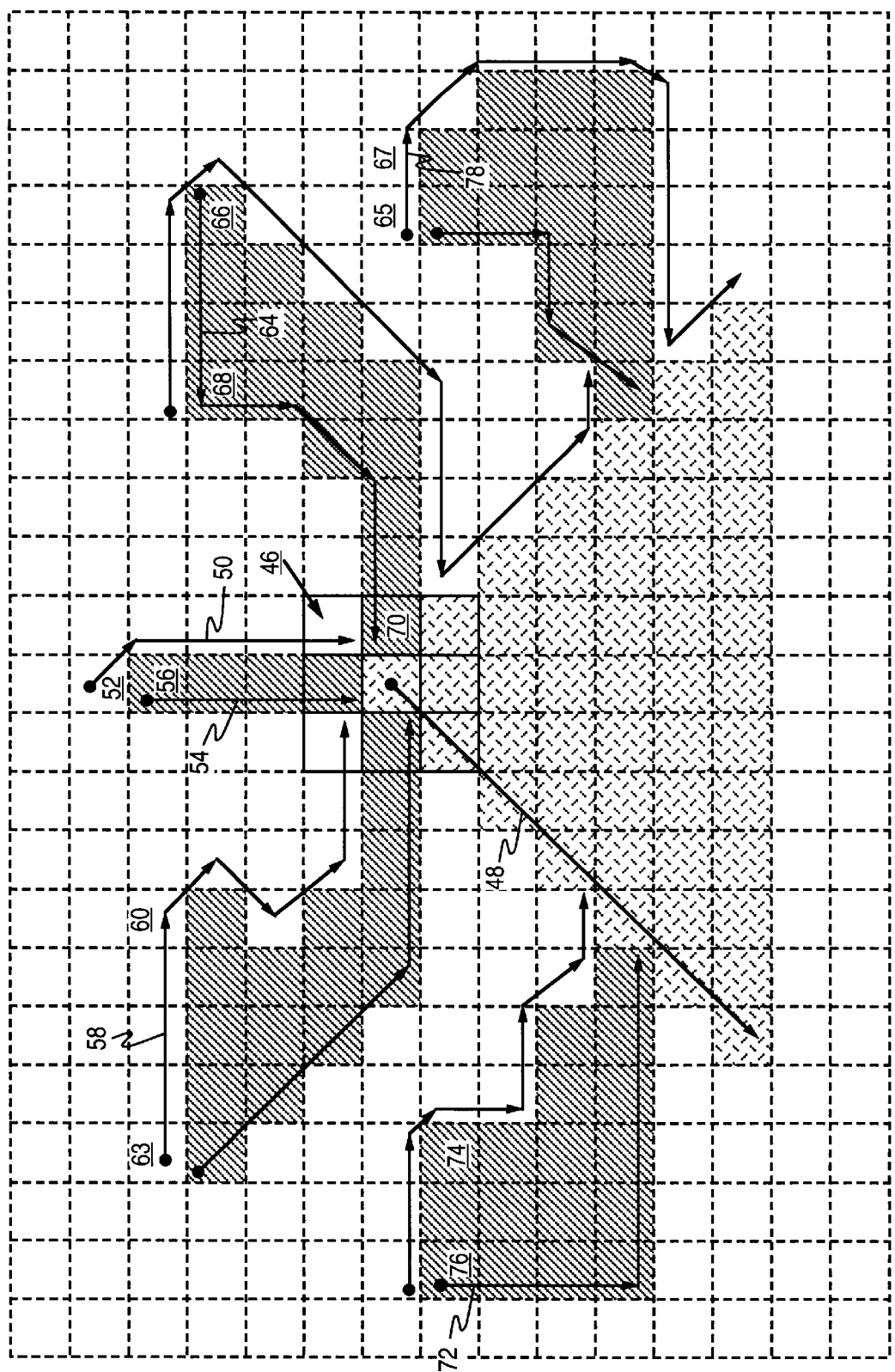
FIG. 5B shows a color raster image with more complex features and the corresponding string sequences generated by the present invention.

A better understanding of how the present invention uses the above priority rules to sequence strings is understood with reference to FIG. 5B which shows a raster image having more complex features and more colors than that of FIG. 5A. In FIG. 5B, only the string sequences representing the west borders are shown; the string sequences for the east borders in FIG. 5B are generated, but for clarity they are not shown. FIG. 5B also illustrates the situation where the neighborhood lookup table 18 of FIG. 2 will output multiple surface strings for a single neighborhood.

Consider, for example, the neighborhood 46 near the center of the image which has the following color pattern:

| Z | Z | Z |
|---|---|---|
| Z | Y | Z |
| Y | Y | Y |

Referring to the above neighborhood lookup table, this color pattern corresponds to entry:

| SURFACE STRINGS | ADR | $P_0P_1P_2$ | $P_3 T P_4$ | $P_5P_6P_7$ |
|---|---|---|---|---|
| 05,02,00,00,00,00; | 7 | Z Z Z | Z Y Z | Y Y Y |

Thus, this entry outputs two surface string IDs [05] and [02]. The surface string [05] begins the string sequence 48 for the west border of the pyramid, and the surface string [02] begins the string sequence (not shown) for the east border of the pyramid.

The string sequence 50 begins with surface string [46] at pixel 52 because it is the most northern pixel, and sequences to surface string [38] which is a corner surface string and thus ends the sequence. Similarly, string sequence 54 begins with surface string [3] at pixel 56 because it is the most northern pixel, and sequences to surface string [36] which, when combined with surface string [30], forms special surface string [51] which is a corner surface string and thus ends the sequence.

String sequence 58 of FIG. 5B begins with surface string [13] at pixel 63 and sequences west to east as shown. The reason string sequence 58 begins with step surface string [13] at pixel 63 is because it has priority over the step surface string [17] at pixel 60 (pixel 63 is more western). The string sequence 64 starting at pixel 66 begins with surface string [41] because it is a protruding corner surface string which has priority over the corner surface string [15] at pixel 68. Thus, surface string 64 sequences from east to west as shown and ends at protruding corner surface string [10] at pixel 70.

String sequence 72 begins with corner surface string [15] at pixel 76 because it has priority over corner surface string [18] at pixel 74 (i.e., it is the more western corner surface string). Similarly, string sequence 78 starts with surface string [13] at pixel 65 because together with surface string [25] at pixel 69 it forms a special case corner surface string [55] which has priority over step surface string [17] at pixel 67. It should be apparent how the remainder of the string sequences in FIG. 5B are generated using the priorities rules listed in the table above.

Contrast Tie Breaker

Figure 6A:
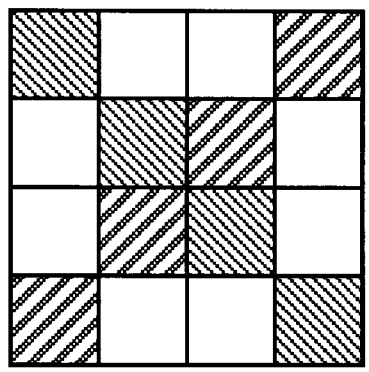
FIGS. 6A–6C illustrate a contrast conflict (contrast tie) in a raster image and how the present invention resolves the conflict.
Figure 6B:
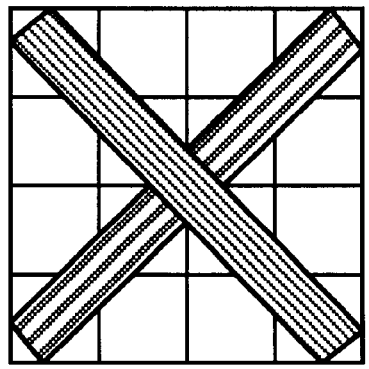
Figure 6C:
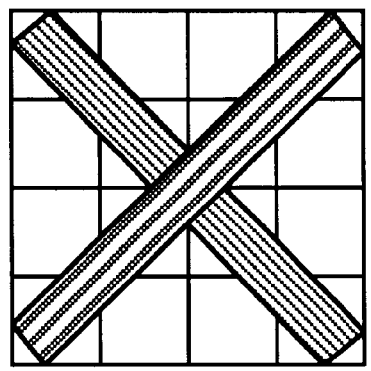

A necessary step in vectorizing a color image is to identify and resolve contrast ties in the image features. A contrast tie occurs when two features overlap such that one feature should appear in the background and the other in the foreground. This phenomenon is illustrated in FIG. 6A which shows a bit map of a raster image with two overlapping diagonal lines. The two possible representations of the diagonal lines in vector format are shown in FIGS. 6B and 6C; however, a human's perception of FIG. 6A will favor the representation shown in FIG. 6C over FIG. 6B. If the contrast iii ties are not resolved "correctly", the image will appear distorted when reconstructed from the vector data.

The contrast breaker 3 of FIG. 2 comprises two components: a contrast tie detector (CTD) for detecting the occurrence of a contrast tie in the raster data, and a contrast tie breaker (CTB) for breaking the contrast ties in a manner that parallels human perception. The general idea is to identify the presence of a contrast tie, and then to resolve or break the tie by changing the color value of a perimeter pixel relative to the target pixel in order to interrupt the string sequence of a recessive image feature, thereby allowing a dominant image feature to appear in the foreground.

Figures 7A, 7B:
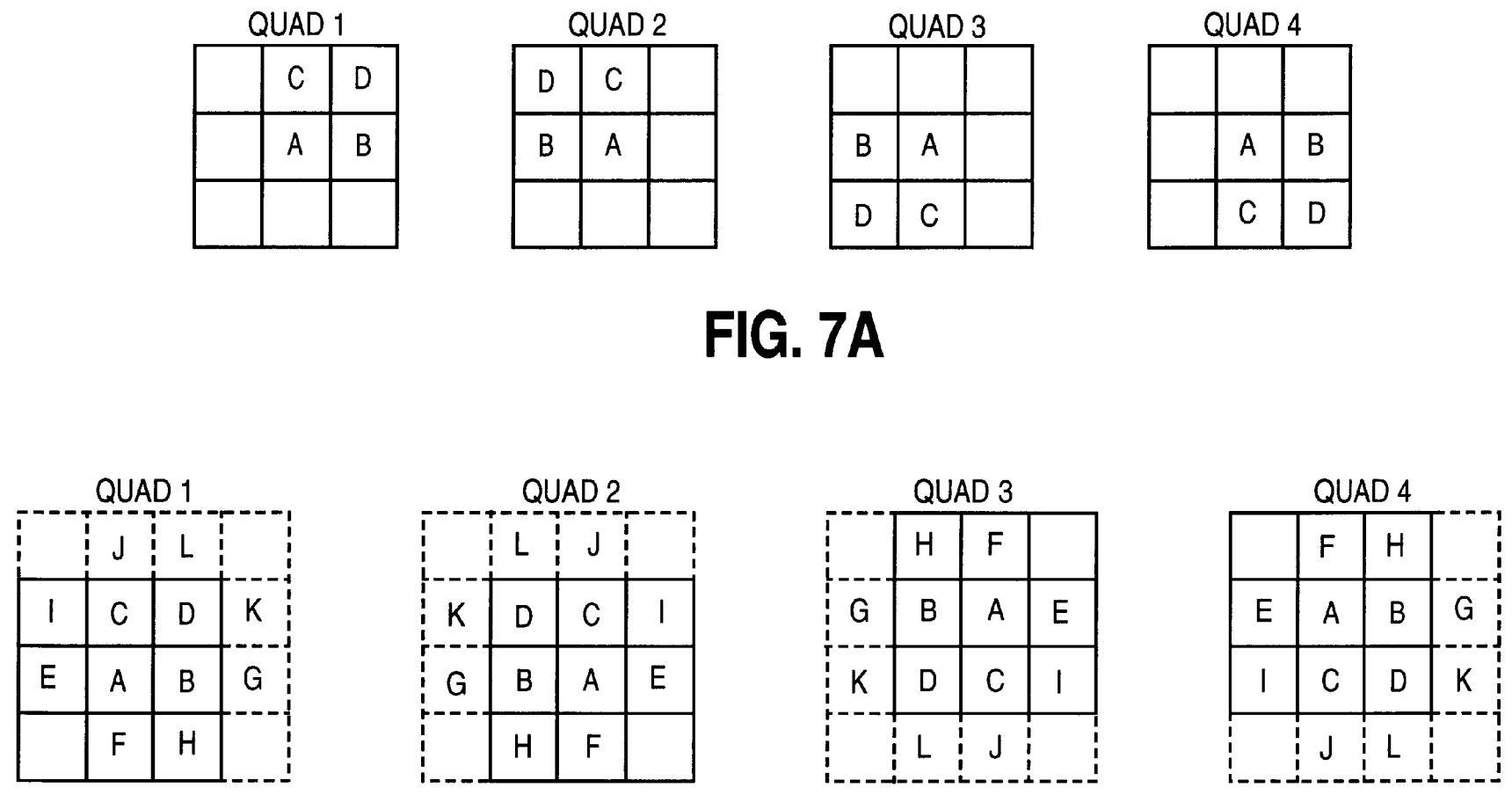

In order to reduce the number of comparison permutations, both the CTD and the CTB operate on quadrant subsections of a 3×3 array of pixels as shown in FIG. 7A. In the preferred embodiment, the contrast tie breaker 3 operates concurrently with the neighborhood scanner 8 described above. For each 3×3 array of pixels processed, the CTD performs a set of comparisons on the pixel data in the four quadrant subsections shown in FIG. 7A. A contrast tie is detected when the color of the A pixel equals the color of the D pixel (A==D), the color of the B pixel equals the color of the C pixel (B==C), and the color of the A pixel does not equal the color of the B pixel (A!=B). The raster bit map shown in FIG. 6A demonstrates when a contrast tie is detected in each of the four quadrants of the 3×3 array of pixels, as is further illustrated in FIGS. 8A–8D.

In order to break a contrast tie, the CTB performs several progressive tests over the pixel data. These tests are performed over additional pixels surrounding the 3×3 array of pixels as illustrated in FIG. 7B. The first test, referred to as the contrast test, performs the following comparisons on the colors of the pixels contrast1= (A!=E)+(A!=F)+(D!=K)+(D!=L), contrast2=(B!=G)+(B!=H)+(C!=I)+(C!=J), A_loses=contrast1>contrast2.

If A_loses is true, then the color identifier for the D pixel is set to Z. That is, the color identifier of the D pixel is set different from the target pixel (the A pixel) so that the string sequence will terminate rather than sequence through the A and D pixels. This provides the desired effect of placing a recessive image feature in the background by breaking the feature into two string sequences as illustrated by the diagonal line sequencing from left to right in FIG. 6C. If A_loses is false, then the color identifier of the D pixel is left unchanged. This provides the desired effect of placing the dominate image feature in the foreground by allowing the string sequence to sequence through the A and D pixels as illustrated by the diagonal line sequencing from right to left in FIG. 6C. If A_loses is neither true nor false (i.e., if contrast1==contrast2), then the contrast test is indeterminate and the CTB performs a further test, referred to as the "brightness" test, to break the contrast tie.

The brightness test compares the brightness of pixel A to that of pixel B. In the preferred embodiment, each pixel comprises a red value, a green value and a blue value (RGB), and a pixel's brightness is generated by summing the RGB values. With the function get_whiteness(x) returning the sum of RGB for pixel x, the brightness test performs the following comparison contrast1=get_whiteness(A), contrast2=get_whiteness(B), A_loses=contrast1 < contrast2.

If A_loses is true, then the color identifier for the D pixel is set to Z, and if A_loses is false, then the color identifier for the D pixel is not modified. If the brightness of the A and D pixels are equal (contrast1==contrast2), then the CTB performs yet another test, referred to as the "boldness" test, to break the contrast tie.

The boldness test compares the boldness of pixel A to that of pixel B, where a pixel's boldness is defined as its largest RGB value. With the function get_boldness(x) returning the largest RGB value for pixel x, the boldness test performs the following comparison contrast1=get_boldness(A), contrast2=get_boldness(B), A_loses=contrast1 < contrast2.

If A_loses is true, then the color identifier for the D pixel is set to Z, and if A_loses is false, then the color identifier for the D pixel is not modified. If the boldness of the A and D pixels are equal (contrast1==contrast2), then the CTB performs a second boldness test by comparing the second largest RGB values of the A and B pixels.

With the function get_2nd_boldness(x) returning the second largest RGB value for pixel x, the second boldness test performs the following comparisons contrast1=get_2nd_boldness(A), contrast2=get_2nd_boldness(B), A_loses=contrast1 < contrast2.

If A_loses is true, then the color identifier for the D pixel is set to Z, and if A_loses is false, then the color identifier for the D pixel is not modified. If the second boldness of the A and D pixels is equal (contrast1==contrast2), then the contrast tie is not broken and the color identifier for the D pixel is left unmodified.

Figure 8A:
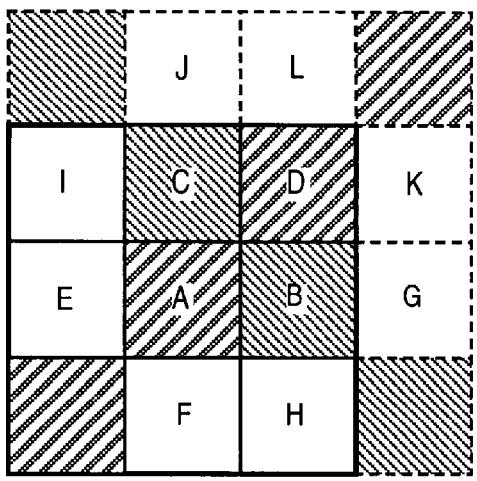
FIGS. 8A–8D illustrate the pixel bit maps evaluated to break a contrast tie in an example raster image.
Figure 8B:
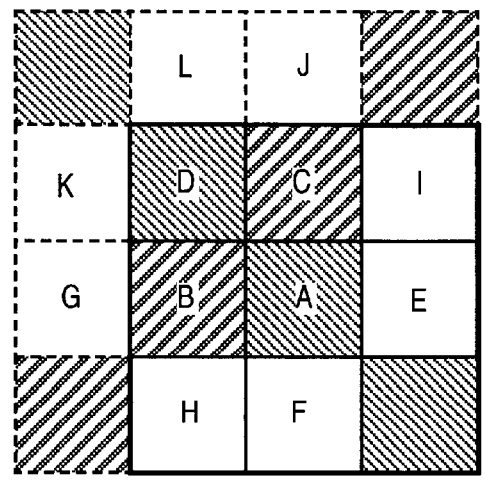
Figure 8C:
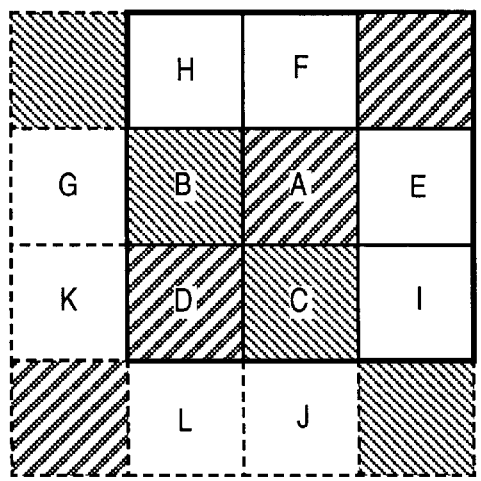
Figure 8D:
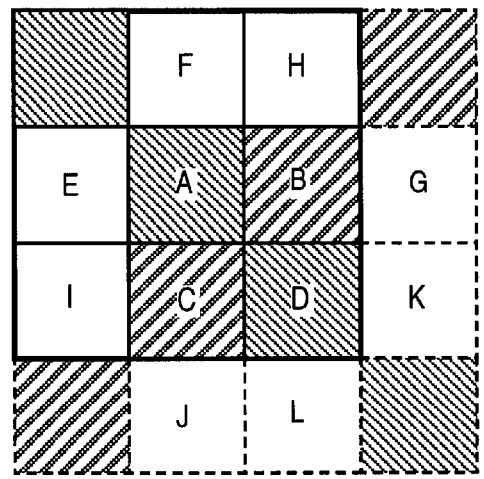

The above CTB tests are further understood with reference to FIGS. 8A–8D which correspond to the raster bit map of FIG. 6A. Referring to FIG. 8A, the CTD detects a contrast tie in quadrant one because the color of pixels A and D are equal, the color of pixels B and C are equal, and the color of pixel A is different from the color of pixel B. Turning to the tests performed by the CTB, the contrast test is indeterminate because contrast1==contrast2. The brightness test will indicate that pixel A is brighter than pixel B, therefore the color identifier for pixel D is not modified (it remains Y) so that the string sequence will sequence through the A and D pixels. Referring to FIG. 8B, the CTD will again detect a contrast tie in quadrant two and again the first test performed by the CTB, the contrast test, will be indeterminate because contrast1== contrast2. However, in this case the brightness test will indicate that pixel A is not brighter than pixel B so the color identifier for pixel D will be set to Z (i.e., different from pixel A). Consequently, the string sequence will terminate at pixel D and begin again at pixel A so that the diagonal line sequencing from left to right in FIG. 6C will appear in the background.

The above description of the contrast tie breaker was initially disclosed in the parent application Ser. No. 09/104,302 filed on Jun. 24, 1998. The above implementation will resolve a contrast tie correctly for a majority of cases encountered, however, the applicants have since discovered improvements to the contrast tie breaker that is capable of resolving contrast ties in additional, less frequent cases, and even cases which exceed human perception. This enhanced version basically expands the number of pixels evaluated with respect to the target pixel in a neighborhood of pixels.

Figures 7C, 7D:
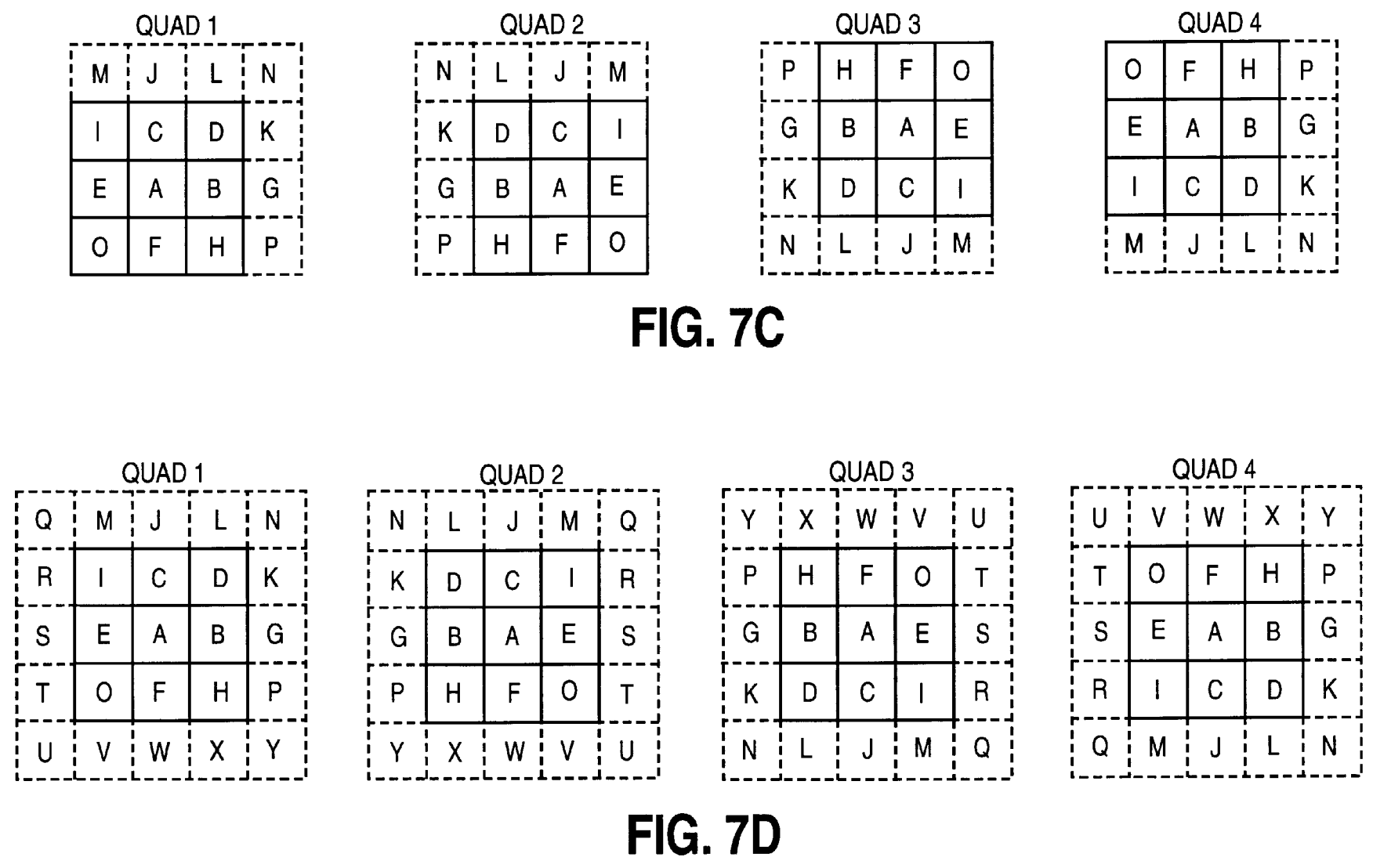

First, the number of pixels evaluated in the above contrast test with respect to FIG. 7B is expanded to include the corner pixels M, N, O, and P of the 4×4 quadrants as shown in FIG. 7C. The comparisons on the colors of the pixels then becomes contrast1=(A!=E)+(A!=F)+(A!=I)+(A!=O)+(A!=H)+ (D!=K)+(D!=L)+(D!=J)+(D!=N)+(D!=G), contrast2=(B!=G)+(B!=H)+(B!=K)+(B!=P)+(B!=F)+ (C!=I)+(C!=J)+(C!=M)+(C!=L)+(C!=E), A_loses=contrast1>contrast2.

As described above, if A_loses is true, then the color identifier for the D pixel is set to Z. That is, the color identifier of the D pixel is set different from the target pixel (the A pixel) so that the string sequence will terminate rather than sequence through the A and D pixels. If A_loses is false, then the color identifier of the D pixel is left unchanged. If A_loses is neither true nor false (i.e., if contrast1==contrast 2), then the contrast test is indeterminate and the CTB performs an additional test, referred to as the "area contrast" test, before performing the above described brightness and boldness tests.

The area contrast test further expands the number of pixels evaluated by increasing the 4×4 array of pixels to a 5×5 array of pixels as shown in FIG. 7D. The color value of the pixels are then evaluated using the following comparisons contrast1=(A!=P)+(A!=M)+(A!=Q)+(A!=R)+(A!=S)+ (A!=T)+(A!=U)+(A!=V)+(A!=W)+(A!=X)+(A!=Y), contrast2=(B!=O)+(B!=N)+(B!=Q)+(B!=R)+(B!=S)+ (B!=T)+(B!=U)+(B!=V)+(B!=W)+(B!=X)+(B!=Y), A_loses=contrast1>contrast2.

Again, if A_loses is true, then the color identifier for the D pixel is set to Z. That is, the color identifier of the D pixel is set different from the target pixel (the A pixel) so that the string sequence will terminate rather than sequence through the A and D pixels. If A_loses is false, then the color identifier of the D pixel is left unchanged. If A_loses is neither true nor false (i.e., if contrast1==contrast2), then the contrast test is indeterminate and the CTB performs the additional brightness and boldness tests described above to break the contrast tie.

Preferred Embodiments

Figure 9:
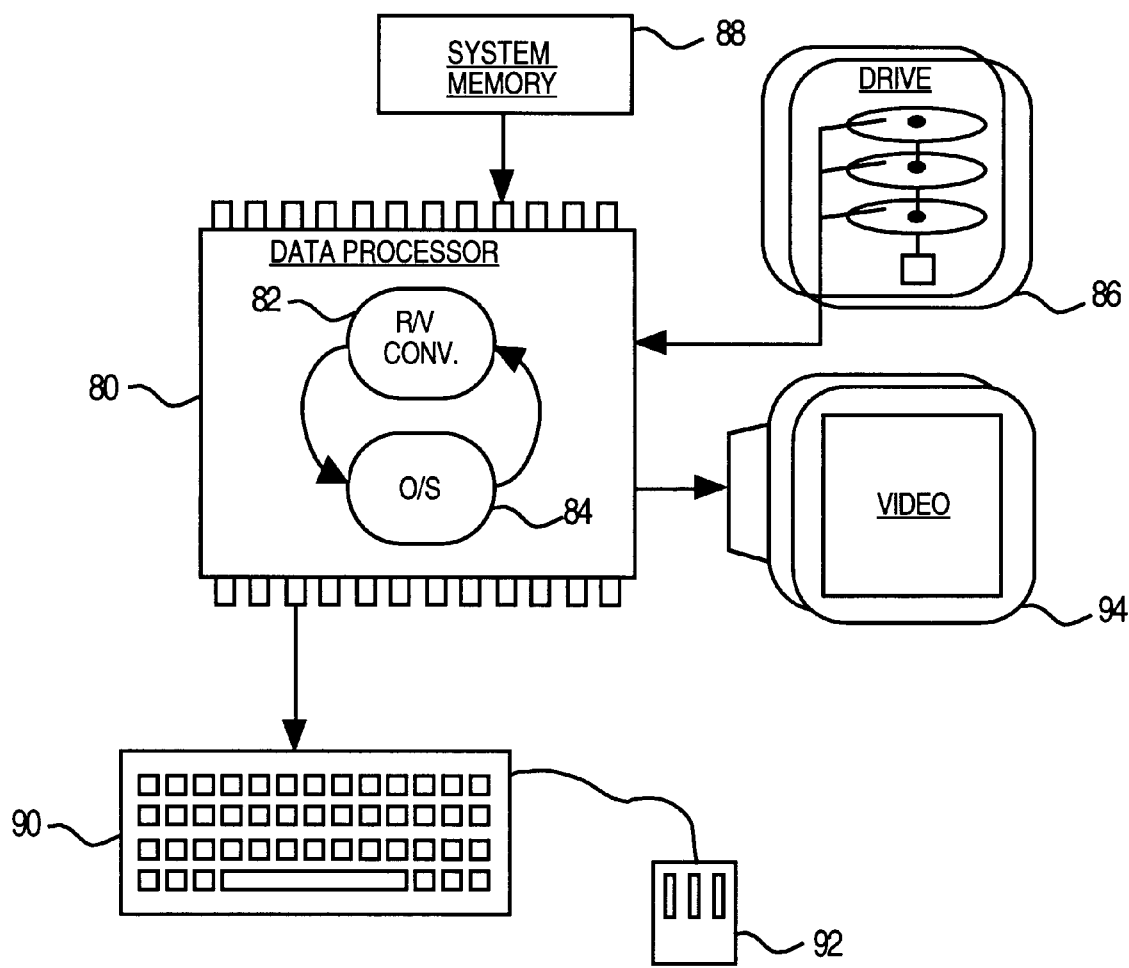
FIG. 9 shows a perceived embodiment of the present invention comprising a system memory for storing a computer program which implements the aspects of the present, and a data processor for executing the steps of the computer program.

Referring now to FIG. 9, shown is an embodiment of the present invention wherein the raster-to-vector (R/V) converter is implemented as a computer program 82 executed by a data processor 80 running under a particular operating system (O/S) 84. A non-volatile memory, such as a disc drive 86, stores the operating system 84 and the R/V converter 82 when the computer system is powered down. When the computer system is powered up, the O/S 84 and R/V converter 82 are loaded into a system memory (RAM) 88, and the data processor 80 reads and executes the O/S 84 and R/V converter 82 from the system memory 88. The raster image to be converted into a vector image may be stored on the disc drive 86, or it may alternatively be loaded in real time from some other external device such as a scanner. An end user may interface with the computer system through a keyboard 90 and mouse 92 in order to direct which raster images are to be converted, and to display the vector images on a video display 94. The source code attached hereto as Appendix A illustrates the composition of the computer program embodiment of the present invention. The source code in Appendix A is written in a programming language referred to as C, but other programming languages, such as Assembly, Pascal or Basic, could easily be employed to implement the various aspects of the present invention.

Figure 10:
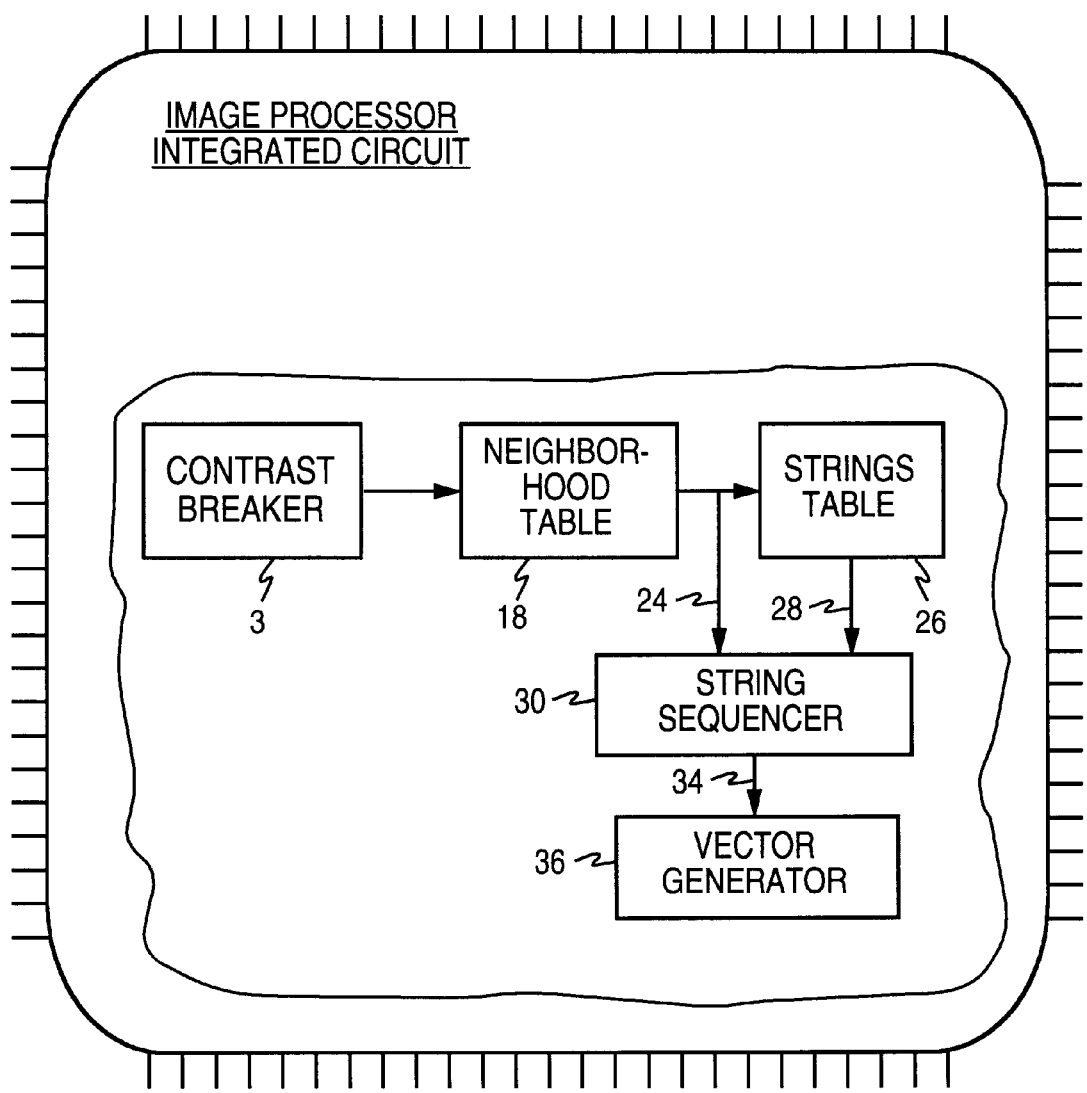
FIG. 10 illustrates an alternative embodiment of the present invention: an image processing integrated circuit comprising logic circuits for implementing the aspects of the present invention.

An alternative embodiment of the present invention is shown in FIG. 10. In this embodiment, the raster-to-vector converter is implemented as part of an image processing integrated circuit. Some of the components shown in FIG. 2 are shown in FIG. 10 as combinatorial logic circuits and lookup tables implemented in transistor circuitry. It is within the ability of those skilled in the art to convert the source code shown in Appendix A into equivalent logic circuits for incorporation into an image processing integrated circuit.

The objects of the invention have been fully realized through the embodiments disclosed herein. Those skilled in the art will appreciate that the aspects of the invention can be achieved through various other embodiments without departing from the essential function. The particular embodiments disclosed are illustrative and not meant to limit the scope of the invention as appropriately construed by the following claims.

We claim:

1. An apparatus for breaking contrast ties in a raster image comprising a plurality of pixels, the apparatus comprising:

a system memory for storing the steps of a computer program; and a computer processor connected to the system memory for executing the steps of the computer program, wherein the computer program comprises:

(a) a contrast tie detector (CTD) for detecting the occurrence of a contrast tie in the raster image by evaluating a color value of individual pixels in an array of pixels; and (b) a contrast tie breaker (CTB) for breaking a contrast tie detected by the CTD, wherein:

(a) the array of pixels comprises a corner 2×2 subset of a 3×3 array of pixels, the 3×3 array comprising the set

| C | D |   |
|---|---|---|
| A | B |   |
|   |   |   |

| D | C |   |
|---|---|---|
| B | A |   |
|   |   |   |

|   |   |   |
|---|---|---|
| B | A |   |
| D | C |   |

|   |   |   |
|---|---|---|
| A | B |   |
| C | D |   |

(b) the array of pixels further comprises

| N | L | J | M |
|---|---|---|---|
| K | D | C | I |
| G | B | A | E |
| P | H | F | O |

(c) the CTB breaks the contrast tie by performing a first operation on the color values of individual pixels, the first operation comprising:

contrast1=(A!=E)+(A!=F)+(A!=I)+(A!=O)+(A!=H)+ (D!=K)+(D!=L)+(D!=J)+(D!=N)+(D!=G), contrast2=(B!=G)+(B!=H)+(B!=K)+(B!=P)+(B!=F)+ (C!=I)+(C!=J)+(C!=M)+(C!=L)+(C!=E), A_loses=contrast1>contrast2, where the comparison function x!=y returns a non-zero positive value if x does not equal y and zero if x equals y.

2. The apparatus for breaking contrast ties in a raster image as recited in claim 1, wherein if A_loses is true, then the CTB modifies an identifier of the D pixel relative to an identifier of the A pixel.

3. The apparatus for breaking contrast ties in a raster image as recited in claim 1, wherein:

(a) the first operation further comprises:

A_ties=contrast1==contrast2; and (b) if A_ties is true, then the CTB performs a second operation on the color values of individual pixels.

4. The apparatus for breaking contrast ties in a raster image as recited in claim 3, wherein:

(a) the array of pixels further comprises

| N | L | J | M | Q |
|---|---|---|---|---|
| K | D | C | I | R |
| G | B | A | E | S |
| P | H | F | O | T |
| Y | X | W | V | U |

(b) the second operation comprising:

contrast1=(A!=P)+(A!=M)+(A!=Q)+(A!=R)+(A!=S)+ (A!=T)+(A!=U)+(A!=V)+(A!=W)+(A!=X)+(A!=Y), contrast2=(B!=O)+(B!=N)+(B!=Q)+(B!=R)+(B!=S)+ (B!=T)+(B!=U)+(B!=V)+(B!=W)+(B!=X)+(B!=Y), A_loses=contrast1>contrast2 where the comparison function x!=y returns a non-zero positive value if x does not equal y and zero if x equals y.

5. The apparatus for breaking contrast ties in a raster image as recited in claim 3, wherein:

(a) the color value of a pixel comprises a red value, a green value, and a blue value;

(b) a function get_whiteness(x) returns a summation value red value+green value+blue value where x is a parameter representing a pixel; and (c) the second operation comprising:

contrast1=get_whiteness(A), contrast2=get_whiteness(B),

A_loses=contrast1 < contrast2.

6. The apparatus for breaking contrast ties in a raster image as recited in claim 5, wherein if A_loses is true, then the CTB modifies an identifier of the D pixel relative to an identifier of the A pixel.

7. The apparatus for breaking contrast ties in a raster image as recited in claim 3, wherein:

(a) the color value of a pixel comprises a red value, a green value, and a blue value;

(b) a function get_boldness(x) returns the largest value of the red value, the green value and the blue value, where x is a parameter representing a pixel; and (c) the second operation comprising:

contrast1=get_boldness(A), contrast2=get_boldness(B),

A_loses=contrast1 < contrast2.

8. The apparatus for breaking contrast ties in a raster image as recited in claim 7, wherein if A_loses is true, then the CTB modifies an identifier of the D pixel relative to an identifier of the A pixel.

9. An image processing integrated circuit for breaking contrast ties in a raster image comprising a plurality of pixels, the image processing integrated circuit comprising:

(a) a contrast tie detector (CTD) for detecting the occurrence of a contrast tie in the raster image by evaluating a color value of individual pixels in an array of pixels; and (b) a contrast tie breaker (CTB) for breaking a contrast tie detected by the CTD, wherein:

(a) the array of pixels comprises a corner 2×2 subset of a 3×3 array of pixels, the 3×3 array comprising the set

|   |   |   |
|---|---|---|
| C | D |   |
| A | B |   |
|   |   |   |

|   |   |   |
|---|---|---|
| D | C |   |
| B | A |   |
|   |   |   |

|   |   |   |
|---|---|---|
|   | B | A |
|   | D | C |
|   |   |   |

|   |   |   |
|---|---|---|
|   |   |   |
|   | A | B |
|   | C | D |

(b) the array of pixels further comprises

| N | L | J | M |
|---|---|---|---|
| K | D | C | I |
| G | B | A | E |
| P | H | F | O |

(c) the CTB breaks the contrast tie by performing a first operation on the color values of individual pixels, the first operation comprising:
contrast1=(A!=E)+(A!=F)+(A!=I)+(A!=O)+(A!=H)+
(D!=K)+(D!=L)+(D!=J)+(D!=N)+(D!=G),
contrast2=(B!=G)+(B!=H)+(B!=K)+(B!=P)+(B!=F)+
(C!=I)+(C!=J)+(C!=M)+(C!=L)+(C!=E),
A_loses=contrast1>contrast2,
where the comparison function x!=y returns a non-zero positive value if x does not equal y and zero if x equals y.

10. The image processing integrated circuit for breaking contrast ties in a raster image as recited in claim 9, wherein if A_loses is true, then the CTB modifies an identifier of the D pixel relative to an identifier of the A pixel.

11. The image processing integrated circuit for breaking contrast ties in a raster image as recited in claim 9, wherein:
(a) the first operation further comprises:
A_ties=contrast1==contrast2; and
(b) if A_ties is true, then the CTB performs a second operation on the color values of individual pixels.

12. The image processing integrated circuit for breaking contrast ties in a raster image as recited in claim 11, wherein:
(a) the array of pixels further comprises

| N | L | J | M | Q |
|---|---|---|---|---|
| K | D | C | I | R |
| G | B | A | E | S |
| P | H | F | O | T |
| Y | X | W | V | U |

(b) the second operation comprising:
contrast1=(A!=P)+(A!=M)+(A!=Q)+(A!=R)+(A!=S)+
(A!=T)+(A!=U)+(A!=V)+(A!=W)+(A!=X)+(A!=Y),
contrast2=(B!=O)+(B!=N)+(B!=Q)+(B!=R)+(B!=S)+
(B!=T)+(B!=U)+(B!=V)+(B!=W)+(B!=X)+(B!=Y),
A_loses=contrast1>contrast2
where the comparison function x!=y returns a non-zero positive value if x does not equal y and zero if x equals y.

13. The image processing integrated circuit for breaking contrast ties in a raster image as recited in claim 11, wherein:
(a) the color value of a pixel comprises a red value, a green value, and a blue value;
(b) a function get_whiteness(x) returns a summation value
red value+green value+blue value
where x is a parameter representing a pixel; and
(c) the second operation comprising:
contrast1=get_whiteness(A),
contrast2=get_whiteness(B),
A_loses=contrast1 < contrast2.

14. The image processing integrated circuit for breaking contrast ties in a raster image as recited in claim 13, wherein if A_loses is true, then the CTB modifies an identifier of the D pixel relative to an identifier of the A pixel.

15. The image processing integrated circuit for breaking contrast ties in a raster image as recited in claim 11, wherein:
(a) the color value of a pixel comprises a red value, a green value, and a blue value;
(b) a function get_boldness(x) returns the largest value of the red value, the green value and the blue value, where x is a parameter representing a pixel; and
(c) the second operation comprising:
contrast1=get_boldness(A),
contrast2=get_boldness(B),
A_loses=contrast1 < contrast2.

16. The image processing integrated circuit for breaking contrast ties in a raster image as recited in claim 15, wherein if A_loses is true, then the CTB modifies an identifier of the D pixel relative to an identifier of the A pixel.

17. A method of breaking contrast ties in a raster image comprising a plurality of pixels, the method comprising the steps of:
(a) detecting the occurrence of a contrast tie in the raster image by evaluating a color value of individual pixels in an array of pixels; and
(b) breaking a detected contrast tie,
wherein:
(a) the array of pixels comprises a corner 2×2 subset of a 3×3 array of pixels, the 3×3 array comprising the set

|   |   |   |
|---|---|---|
| C | D |   |
| A | B |   |
|   |   |   |

|   |   |   |
|---|---|---|
| D | C |   |
| B | A |   |
|   |   |   |

|   |   |   |
|---|---|---|
|   | B | A |
|   | D | C |
|   |   |   |

|   |   |   |
|---|---|---|
|   |   |   |
|   | A | B |
|   | C | D |

(b) the array of pixels further comprises

| N | L | J | M |
|---|---|---|---|
| K | D | C | I |
| G | B | A | E |
| P | H | F | O |

(c) the step of breaking the detected contrast tie comprises the step of performing a first operation on the color values of individual pixels, the first operation comprising:
contrast1=(A!=E)+(A!=F)+(A!=I)+(A!=O)+(A!=H)+
(D!=K)+(D!=L)+(D!=J)+(D!=N)+(D!=G),
contrast2=(B!=G)+(B!=H)+(B!=K)+(B!=P)+(B!=F)+
(C!=I)+(C!=J)+(C!=M)+(C!=L)+(C!=E),
A_loses=contrast1>contrast2, where the comparison function x!=y returns a non-zero positive value if x does not equal y and zero if x equals y.

18. The method of breaking contrast ties in a raster image as recited in claim 17, wherein if A_loses is true, then the step of breaking the detected contrast tie comprises the step of modifying an identifier of the D pixel relative to an identifier of the A pixel.

19. The method of breaking contrast ties in a raster image as recited in claim 17, wherein:
   (a) the first operation further comprises:
      A_ties=contrast1==contrast2; and
   (b) if A_ties is true, then the step of breaking the detected contrast tie comprises the step of performing a second operation on the color values of individual pixels.

20. The method of breaking contrast ties in a raster image as recited in claim 19, wherein:
   (a) the array of pixels further comprises

| N | L | J | M | Q |
|---|---|---|---|---|
| K | D | C | I | R |
| G | B | A | E | S |
| P | H | F | O | T |
| Y | X | W | V | U |

(b) the second operation comprising:
      contrast1=(A!=P)+(A!=M)+(A!=Q)+(A!=R)+(A!=S)+
         (A!=T)+(A!=U)+(A!=V)+(A!=W)+(A!=X)+(A!=Y),
      contrast2=
         (B!=O)+(B!=N)+(B!=Q)+(B!=R)+
         (B!=S)+(B!=T)+(B!=U)+(B!=V)+
      (B!=W)+(B!=X)+(B!=Y),
      A_loses=contrast1>contrast2
      where the comparison function x!=y returns a non-zero positive value if x does not equal y and zero if x equals y.

21. The method of breaking contrast ties in a raster image as recited in claim 19, wherein:
   (a) the color value of a pixel comprises a red value, a green value, and a blue value;
   (b) a function get_whiteness(x) returns a summation value
      red value+green value+blue value
      where x is a parameter representing a pixel; and
   (c) the second operation comprising:
      contrast1=get_whiteness(A),
      contrast2=get_whiteness(B),
      A_loses=contrast1 < contrast2.

22. The method of breaking contrast ties in a raster image as recited in claim 21, wherein if A_loses is true, then the step of breaking the detected contrast tie comprises the step of modifying an identifier of the D pixel relative to an identifier of the A pixel.

23. The method of breaking contrast ties in a raster image as recited in claim 19, wherein:
   (a) the color value of a pixel comprises a red value, a green value, and a blue value;
   (b) a function get_boldness(x) returns the largest value of the red value, the green value and the blue value, where x is a parameter representing a pixel; and
   (c) the second operation comprising:
      contrast1=get_boldness(A),
      contrast2=get_boldness(B),
      A_loses=contrasts < contrast2.

24. The method of breaking contrast ties in a raster image as recited in claim 23, wherein if A_loses is true, then the step of breaking the detected contrast tie comprises the step of modifying an identifier of the D pixel relative to an identifier of the A pixel.

25. A computer program embodied on a computer-readable medium for breaking contrast ties in a raster image comprising a plurality of pixels, the computer program comprising source code segments comprising:
   a system memory for storing the steps of a computer program; and
   a computer processor connected to the system memory for executing the steps of the computer program,
   wherein the computer program comprises:
   (a) a contrast tie detector (CTD) for detecting the occurrence of a contrast tie in the raster image by evaluating a color value of individual pixels in an array of pixels; and
   (b) a contrast tie breaker (CTB) for breaking a contrast tie detected by the CTD,
   wherein:
   (a) the array of pixels comprises a corner 2×2 subset of a 3×3 array of pixels, the 3×3 array comprising the set

| | C | D |
|---|---|---|
| | A | B |
| | | |

| D | C | |
|---|---|---|
| B | A | |
| | | |

| | | |
|---|---|---|
| B | A | |
| D | C | |

| | | |
|---|---|---|
| A | B | |
| C | D | |

(b) the array of pixels further comprises

| N | L | J | M |
|---|---|---|---|
| K | D | C | I |
| G | B | A | E |
| P | H | F | O |

(c) the CTB breaks the contrast tie by performing a first operation on the color values of individual pixels, the first operation comprising:
      contrast1=(A!=E)+(A!=F)+(A!=I)+(A!=O)+(A!=H)+
         (D!=K)+(D!=L)+(D!=J)+(D!=N)+(D!=G),
      contrast2=(B!=G)+(B!=H)+(B!=K)+(B!=P)+(B!=F)+
         (C!=I)+(C!=J)+(C!=M)+(C!=L)+(C!=E),
      A_loses=contrast1>contrast2.
      where the comparison function x!=y returns a non-zero positive value if x does not equal y and zero if x equals y.

26. The computer program for breaking contrast ties in a raster image as recited in claim 25, wherein if A_loses is true, then the CTB modifies an identifier of the D pixel relative to an identifier of the A pixel.

27. The computer program for breaking contrast ties in a raster image as recited in claim 25, wherein:
   (a) the first operation further comprises:
      A_ties=contrast1==contrast2; and
   (b) if A_ties is true, then the CTB performs a second operation on the color values of individual pixels.

28. The computer program for breaking contrast ties in a raster image as recited in claim 27, wherein:
(a) the array of pixels further comprises

| N | L | J | M | Q |
|---|---|---|---|---|
| K | D | C | I | R |
| G | B | A | E | S |
| P | H | F | O | T |
| Y | X | W | V | U |

(b) the second operation comprising:
contrast1=(A!=P)+(A!=M)+(A!=Q)+(A!=R)+(A!=S)+(A!=T)+(A!=U)+(A!=V)+(A!=W)+(A!=X)+(A!=Y),
contrast2=
(B!=O)+(B!=N)+(B!=Q)+(B!=R)+
(B!=S)+(B!=T)+(B!=U)+(B!=V)+
(B!=W)+(B!=X)+(B!=Y),
A_loses=contrast1>contrast2
where the comparison function x!=y returns a non-zero positive value if x does not equal y and zero if x equals y.

29. The computer program for breaking contrast ties in a raster image as recited in claim 27, wherein:
(a) the color value of a pixel comprises a red value, a green value, and a blue value;
(b) a function get_whiteness(x) returns a summation value
red value+green value+blue value
where x is a parameter representing a pixel; and
(c) the second operation comprising:
contrast1=get_whiteness(A),
contrast2=get_whiteness(B),
A_loses=contrast1 < contrast2.

30. The computer program for breaking contrast ties in a raster image as recited in claim 29, wherein if A_loses is true, then the CTB modifies an identifier of the D pixel relative to an identifier of the A pixel.

31. The computer program for breaking contrast ties in a raster image as recited in claim 27, wherein:
(a) the color value of a pixel comprises a red value, a green value, and a blue value;
(b) a function get_boldness(x) returns the largest value of the red value, the green value and the blue value, where x is a parameter representing a pixel; and
(c) the second operation comprising:
contrast1=get_boldness(A),
contrast2=get_boldness(B),
A_loses=contrast1 < contrast2.

32. The computer program for breaking contrast ties in a raster image as recited in claim 31, wherein if A_loses is true, then the CTB modifies an identifier of the D pixel relative to an identifier of the A pixel.

* * * * *